United States Patent
Rafique

(10) Patent No.: US 11,469,498 B2
(45) Date of Patent: Oct. 11, 2022

(54) SYSTEMS AND METHODS FOR SELF-CALIBRATION OF AN ANALOG BEAMFORMING TRANSCEIVER

(71) Applicant: Telefonaktiebolaget LM Ericsson (publ), Stockholm (SE)

(72) Inventor: Raihan Rafique, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 16/645,845

(22) PCT Filed: Sep. 15, 2017

(86) PCT No.: PCT/EP2017/073299
§ 371 (c)(1),
(2) Date: Mar. 10, 2020

(87) PCT Pub. No.: WO2019/052655
PCT Pub. Date: Mar. 21, 2019

(65) Prior Publication Data
US 2020/0280128 A1    Sep. 3, 2020

(51) Int. Cl.
*H01Q 3/26* (2006.01)
*H04B 17/14* (2015.01)

(52) U.S. Cl.
CPC ............ *H01Q 3/267* (2013.01); *H04B 17/14* (2015.01)

(58) Field of Classification Search
CPC . H03M 1/1014–1038; H04B 17/11–29; H04B 17/14; H01Q 3/267
See application file for complete search history.

(56) References Cited

U.S. PATENT DOCUMENTS 5,107,273 A    4/1992  Roberts
5,657,023 A    8/1997  Lewis et al.
(Continued)

FOREIGN PATENT DOCUMENTS

CN    106707250 A    5/2017
CN    107085202 A    8/2017
(Continued)

OTHER PUBLICATIONS

Goossens, Roald, et al., "Optimal beam forming in the presence of mutual coupling," Proceedings of the 2006 Symposium on Communications and Vehicular Technology, Nov. 23, 2006, Liege, Belgium, pp. 13-18.
(Continued)

*Primary Examiner* — Jinsong Hu
*Assistant Examiner* — Rui M Hu
(74) *Attorney, Agent, or Firm* — Withrow & Terranova, PLLC

(57) ABSTRACT

Systems and methods are disclosed herein for self-calibration of an analog beamforming transceiver. In some embodiments, a method of operation of a self-calibration subsystem of an analog beamforming transceiver comprises, for each of multiple receive antenna elements for each of multiple transmit beam directions: transmitting a signal in the transmit beam direction via multiple transmit antenna elements of a second polarization and obtaining a measurement value for a received signal received via the receive antenna element of a first polarization responsive to the transmitted signal. The method further comprises computing calibration values for the receive antenna elements of the first polarization and calibration values for the transmit antenna elements of the second polarization based on the obtained measurement values. The method further comprises applying the calibration values for the receive antenna elements of the first (Continued)

polarization and the calibration values for the transmit antenna elements of the second polarization.

25 Claims, 11 Drawing Sheets

(56) References Cited

U.S. PATENT DOCUMENTS

| | | | |
|---|---|---|---|
| 6,295,027 B1 | 9/2001 | Wixforth et al. | |
| 8,154,452 B2 | 4/2012 | Webb | |
| 8,199,048 B1 | 6/2012 | Medina Sanchez | |
| 8,842,040 B1 * | 9/2014 | Dorsey | H01Q 3/267 342/174 |
| 8,891,598 B1 | 11/2014 | Wang et al. | |
| 2003/0179137 A1 * | 9/2003 | White | H01Q 1/521 455/278.1 |
| 2005/0239506 A1 | 10/2005 | Li | |
| 2006/0119511 A1 | 6/2006 | Collinson | |
| 2011/0006949 A1 | 1/2011 | Webb | |
| 2011/0133740 A1 | 6/2011 | Seydoux et al. | |
| 2011/0134001 A1 * | 6/2011 | Sakata | G01R 29/105 343/703 |
| 2012/0001810 A1 | 1/2012 | Soualle et al. | |
| 2012/0146841 A1 | 6/2012 | Ookawa | |
| 2012/0154206 A1 | 6/2012 | Medina Sanchez | |
| 2013/0077708 A1 | 3/2013 | Sorrells et al. | |
| 2013/0301487 A1 | 11/2013 | Khandani | |
| 2014/0022125 A1 | 1/2014 | Zhu et al. | |
| 2014/0269554 A1 | 9/2014 | Shapira et al. | |
| 2015/0092621 A1 | 4/2015 | Jalloul et al. | |
| 2016/0043465 A1 | 2/2016 | McDevitt et al. | |
| 2016/0049995 A1 * | 2/2016 | André | H04B 17/14 370/277 |
| 2018/0034624 A1 * | 2/2018 | Shirinfar | H01Q 3/26 |
| 2018/0198537 A1 * | 7/2018 | Rexberg | H04B 17/14 |
| 2020/0067466 A1 * | 2/2020 | Kushnir | H03F 3/245 |
| 2020/0124651 A1 * | 4/2020 | Durand | G01R 29/10 |
| 2020/0145033 A1 | 5/2020 | Rafique | |

FOREIGN PATENT DOCUMENTS

| | | |
|---|---|---|
| EP | 2173010 A1 | 4/2010 |
| EP | 2911323 A1 | 8/2015 |
| KR | 20170011906 A | 2/2017 |
| WO | 2012038783 A1 | 3/2012 |
| WO | 2012074446 A1 | 6/2012 |
| WO | 2013124762 A1 | 8/2013 |
| WO | 2017001013 A1 | 1/2017 |
| WO | 2017202453 A1 | 11/2017 |
| WO | 2017202469 A1 | 11/2017 |
| WO | 2017211408 A1 | 12/2017 |
| WO | 2018166575 A1 | 9/2018 |
| WO | 2020064128 A1 | 4/2020 |

OTHER PUBLICATIONS

Shipley, Charles, et al., "Mutual Coupling-Based Calibration of Phased Array Antennas," IEEE International Conference on Phased Array Systems and Technology, Dana Point, CA, 2000, pp. 529-532.

Vieira, Joao, et al., "A Receive/Transmit Calibration Technique based on Mutual Coupling for Massive MIMO Base Stations," IEEE International Symposium on Personal, Indoor and Mobile Radio Communications (PIMRC): Fundamentals and PHY, Valencia, Jan. 1, 2016, pp. 1-6.

International Search Report and Written Opinion for International Patent Application No. PCT/EP2017/055818, dated Nov. 10, 2017, 13 pages.

International Search Report and Written Opinion for International Patent Application No. PCT/EP2017/073299, dated Jun. 12, 2018, 14 pages.

Author Unknown, "Broadband Radio Access Networks (BRAN); 5 GHz high performance RLAN; Harmonized EN covering the essential requirements of article 3.2 of the R&TTE Directive," ETSI EN 301 893, Version 1.8.1, Mar. 2015, 93 pages.

Author Unknown, "Technical Specification Group Radio Access Network; Evolved Universal Terrestrial Radio Access (E-UTRA); Physical channels and modulation (Release 14)," 3GPP TS 36.211, Sep. 2016, 170 pages.

Author Unknown, "Technical Specification Group Radio Access Network; Evolved Universal Terrestrial Radio Access (E-UTRA); Physical layer procedures (Release 14)," 3GPP TS 36.213, Sep. 2016, 406 pages.

Author Unknown, "Technical Specification Group Radio Access Network; Evolved Universal Terrestrial Radio Access (E-UTRA); Radio Resource Control (RRC); Protocol specification (Release 14)," 3GPP TS 36.331, Sep. 2016, 644 pages.

International Search Report and Written Opinion for International Patent Application No. PCT/EP2018/076476, dated Apr. 25, 2019, 19 pages.

Intention to Grant for European Patent Application No. 17767841.4, dated May 10, 2021, 5 pages.

Non-Final Office Action for U.S. Appl. No. 16/486,416, dated Apr. 1, 2021, 12 pages.

\* cited by examiner

US 11,469,498 B2

SYSTEMS AND METHODS FOR SELF-CALIBRATION OF AN ANALOG BEAMFORMING TRANSCEIVER

This application is a 35 U.S.C. § 371 national phase filing of International Application No. PCT/EP2017/073299, filed Sep. 15, 2017, the disclosure of which is incorporated herein by reference in its entirety.

TECHNICAL FIELD

The present disclosure relates to on the fly self-calibration of an analog beamforming antenna system.

BACKGROUND

An Advanced Antenna System (AAS) includes multiple antenna elements in a matrix, or antenna array. Each antenna is connected to a radio front-end of a transceiver. A phase tuner and gain stage is connected between the radio front-end and the AAS to enable phase and gain tuning for, e.g., analog beamforming. Specifically, phase and gain adjustments for the AAS can be made to direct a beam of the AAS in a desired direction. For example, phase and gain adjustments can be made to direct a transmission towards a desired receiver.

One issue that arises with an AAS and, in particular, with an analog beamforming transceiver including an AAS, is that there are variations in gain and phase between different antenna elements due to, e.g., manufacturing tolerances for the various components in the associated transmit or receive path, temperature gradients, etc. These variations result in undesired errors in analog beamforming. Therefore, there is a need for systems and methods for calibrating the gain and phase of the antenna elements in an AAS.

Conventional self-calibration techniques used by an analog beamforming transceiver to perform self-calibration of the gain and phase of each antenna element in the AAS are time consuming and need many measurements. When it comes to self-calibration, the coupling between different elements and a reference antenna element is asymmetrical. This results in phase and gain errors.

International Publication No. WO 2017/001013 A1 teaches a technique for calibrating for an antenna array. However, this technique is rather slow and requires many calculations, particularly when the antenna array has many antenna elements, because it requires reconfiguring switches and transmit/receive operations for the antenna elements in such a manner as to separately obtain signal transfer measurements between each pair of antenna elements.

Thus, when it comes to on the fly self-calibration of an analog beamforming AAS utilizing coupling, there is a need for a new method that is fast and can work during transmitting actual (i.e., "live") signals.

SUMMARY

Systems and methods are disclosed herein for self-calibration of an analog beamforming transceiver. In some embodiments, a method of operation of a self-calibration subsystem of an analog beamforming transceiver comprises, for each receive antenna element of a plurality of receive antenna elements of a first polarization for each transmit beam direction of a plurality of transmit beam directions for a second polarization: transmitting a signal in the transmit beam direction via a plurality of transmit antenna elements of a second polarization and obtaining a measurement value for a received signal received via the receive antenna element of the first polarization responsive to the signal transmitted in the first beam direction via the plurality of transmit antenna elements of the second polarization. The method further comprises computing calibration values for the plurality of receive antenna elements of the first polarization and calibration values for the plurality of transmit antenna elements of the second polarization based on the measurement values obtained for each of the plurality of receive antenna elements of the first polarization for each of the plurality of transmit beam directions for the second polarization and known coupling factors between the plurality of receive antenna elements of the first polarization and the plurality of transmit antenna elements of the second polarization. The method further comprises applying the calibration values for the plurality of receive antenna elements of the first polarization and the calibration values for the plurality of transmit antenna elements of the second polarization. The plurality of receive antenna elements being a subset or all receive antenna elements of the first polarization, the plurality of transmit antenna elements being a subset or all transmit antenna elements of the second polarization, and the plurality of transmit beam direction for the second polarization being all or a subset of all transmit beam directions for the second polarization.

In some embodiments, the method further comprises, for each receive antenna element of a plurality of receive antenna elements of the second polarization for each transmit beam direction of a plurality of transmit beam directions for the first polarization: transmitting a signal in the transmit beam direction via a plurality of transmit antenna elements of the first polarization and obtaining a measurement value for a received signal received via the receive antenna element of the second polarization responsive to the signal transmitted in the first beam direction via the plurality of transmit antenna elements of the first polarization. The method further comprises computing calibration values for the plurality of receive antenna elements of the second polarization and calibration values for the plurality of transmit antenna elements of the first polarization based on the measurement values obtained for each of the plurality of receive antenna elements of the second polarization for each of the plurality of transmit beam directions for the first polarization and known coupling factors between the plurality of receive antenna elements of the second polarization and the plurality of transmit antenna elements of the first polarization. The method further comprises applying the calibration values for the plurality of receive antenna elements of the second polarization and the calibration values for the plurality of transmit antenna elements of the first polarization.

In some embodiments, the calibration values for the plurality of receive antenna elements of the first polarization are gain and phase correction values for the plurality of receive antenna elements of the first polarization that are normalized to gain and phase values for a reference receive antenna element of the first polarization. The calibration values for the plurality of transmit antenna elements of the second polarization are gain and phase correction values for the plurality of transmit antenna elements of the second polarization that are normalized to gain and phase values for a reference transmit antenna element of the second polarization. The calibration values for the plurality of receive antenna elements of the second polarization are gain and phase correction values for the plurality of receive antenna elements of the second polarization that are normalized to gain and phase values for a reference receive antenna element of the second polarization. The calibration values for the plurality of transmit antenna elements of the first polarization are gain and phase correction values for the plurality of transmit antenna elements of the first polarization that are normalized to gain and phase values for a reference transmit antenna element of the first polarization.

In some embodiments, the method further comprises, prior to applying the calibration values, determining whether any of the gain values for the plurality of transmit antenna elements of the first polarization exceed a maximum transmit gain of the analog beamforming transceiver and, if any of the gain values for the plurality of transmit antenna elements of the first polarization exceed the maximum transmit gain, normalizing the gain values for the plurality of transmit antenna elements of the first polarization and an inverse of the gain values for the plurality of receive antenna elements of the first polarization with the maximum transmit gain.

In some embodiments, the method further comprises, prior to applying the calibration values, determining whether any of the gain values for the plurality of receive antenna elements of the first polarization exceed a maximum receive gain of the analog beamforming transceiver and, if any of the gain values for the plurality of receive antenna elements of the first polarization exceed the maximum receive gain, normalizing the gain values for the plurality of receive antenna elements of the first polarization and an inverse of the gain values for the plurality of transmit antenna elements of the first polarization with the maximum receive gain.

In some embodiments, the method further comprises, prior to applying the calibration values, determining whether any of the gain values for the plurality of transmit antenna elements of the second polarization exceed a maximum transmit gain of the analog beamforming transceiver and, if any of the gain values for the plurality of transmit antenna elements of the second polarization exceed the maximum transmit gain, normalizing the gain values for the plurality of transmit antenna elements of the second polarization and an inverse of the gain values for the plurality of receive antenna elements of the second polarization with the maximum transmit gain.

In some embodiments, the method further comprises, prior to applying the calibration values, determining whether any of the gain values for the plurality of receive antenna elements of the second polarization exceed a maximum receive gain of the analog beamforming transceiver and, if any of the gain values for the plurality of receive antenna elements of the second polarization exceed the maximum receive gain, normalizing the gain values for the plurality of receive antenna elements of the second polarization and an inverse of the gain values for the plurality of transmit antenna elements of the second polarization with the maximum receive gain.

In some embodiments, the plurality of receive antenna elements of the first polarization are implemented on separate hardware than that of the plurality of transmit antenna elements of the second polarization.

In some embodiments, the plurality of receive antenna elements of the second polarization are implemented on separate hardware than that of the plurality of transmit antenna elements of the first polarization.

In some embodiments, the signals transmitted via the plurality of transmit antenna elements of the second polarization are live signals.

In some embodiments, the self-calibration subsystem is integrated with the analog beamforming transceiver. In some other embodiments, at least part of the self-calibration subsystem is implemented as one or more virtual components that are executing on one or more processing nodes in a network.

Embodiments of an analog beamforming transceiver are also disclosed. In some embodiments, an analog beamforming transceiver comprises an antenna system comprising receive antenna elements of a first polarization and transmit antenna elements of a second polarization and gain and phase adjustment circuitry adapted to provide gain and phase adjustments, in an analog domain, for the receive antenna elements of the first polarization and the transmit antenna elements of the second polarization. A self-calibration subsystem is operable to, for each receive antenna element of a plurality of receive antenna elements of the first polarization for each transmit beam direction of a plurality of transmit beam directions for the second polarization: transmit a signal in the transmit beam direction via a plurality of transmit antenna elements of the second polarization, and obtain a measurement value for a received signal received via the receive antenna element of the first polarization responsive to the signal transmitted in the first beam direction via the plurality of transmit antenna elements of the second polarization. The self-calibration subsystem is further operable to compute calibration values for the plurality of receive antenna elements of the first polarization and calibration values for the plurality of transmit antenna elements of the second polarization based on the measurement values obtained for each of the plurality of receive antenna elements of the first polarization for each of the plurality of transmit beam directions for the second polarization and known coupling factors between the plurality of receive antenna elements of the first polarization and the plurality of transmit antenna elements of the second polarization. The self-calibration subsystem is further operable to apply, via the gain and phase adjustment circuitry, the calibration values for the plurality of receive antenna elements of the first polarization and the calibration values for the plurality of transmit antenna elements of the second polarization.

In some embodiments, the antenna system further comprises receive antenna elements of the second polarization and transmit antenna elements of the first polarization, and the self-calibration subsystem is further operable to, for each receive antenna element of a plurality of receive antenna elements of the second polarization for each transmit beam direction of a plurality of transmit beam directions for the first polarization: transmit a signal in the transmit beam direction via a plurality of transmit antenna elements of the first polarization, and obtain a measurement value for a received signal received via the receive antenna element of the second polarization responsive to the signal transmitted in the first beam direction via the plurality of transmit antenna elements of the first polarization. The self-calibration subsystem is further operable to compute calibration values for the plurality of receive antenna elements of the second polarization and calibration values for the plurality of transmit antenna elements of the first polarization based on the measurement values obtained for each of the plurality of receive antenna elements of the second polarization for each of the plurality of transmit beam directions for the first polarization and known coupling factors between the plurality of receive antenna elements of the second polarization and the plurality of transmit antenna elements of the first polarization. The self-calibration subsystem is further operable to apply, via the gain and phase adjustment circuitry, the calibration values for the plurality of receive antenna elements of the second polarization and the calibration values for the plurality of transmit antenna elements of the first polarization.

In some embodiments, the calibration values for the plurality of receive antenna elements of the first polarization are gain and phase correction values for the plurality of receive antenna elements of the first polarization that are normalized to gain and phase values for a reference receive antenna element of the first polarization. The calibration values for the plurality of transmit antenna elements of the second polarization are gain and phase correction values for the plurality of transmit antenna elements of the second polarization that are normalized to gain and phase values for a reference transmit antenna element of the second polarization. The calibration values for the plurality of receive antenna elements of the second polarization are gain and phase correction values for the plurality of receive antenna elements of the second polarization that are normalized to gain and phase values for a reference receive antenna element of the second polarization. The calibration values for the plurality of transmit antenna elements of the first polarization are gain and phase correction values for the plurality of transmit antenna elements of the first polarization that are normalized to gain and phase values for a reference transmit antenna element of the first polarization.

In some embodiments, the self-calibration subsystem is further operable to, prior to applying the calibration values, determine whether any of the gain values for the plurality of transmit antenna elements of the first polarization exceed a maximum transmit gain of the analog beamforming transceiver and, if any of the gain values for the plurality of transmit antenna elements of the first polarization exceed the maximum transmit gain, normalize the gain values for the plurality of transmit antenna elements of the first polarization and an inverse of the gain values for the plurality of receive antenna elements of the first polarization with the maximum transmit gain.

In some embodiments, the self-calibration subsystem is further operable to, prior to applying the calibration values, determine whether any of the gain values for the plurality of receive antenna elements of the first polarization exceed a maximum receive gain of the analog beamforming transceiver and, if any of the gain values for the plurality of receive antenna elements of the first polarization exceed the maximum receive gain, normalize the gain values for the plurality of receive antenna elements of the first polarization and an inverse of the gain values for the plurality of transmit antenna elements of the first polarization with the maximum receive gain.

In some embodiments, the self-calibration subsystem is further operable to, prior to applying the calibration values, determine whether any of the gain values for the plurality of transmit antenna elements of the second polarization exceed a maximum transmit gain of the analog beamforming transceiver and, if any of the gain values for the plurality of transmit antenna elements of the second polarization exceed the maximum transmit gain, normalize the gain values for the plurality of transmit antenna elements of the second polarization and an inverse of the gain values for the plurality of receive antenna elements of the second polarization with the maximum transmit gain.

In some embodiments, the self-calibration subsystem is further operable to, prior to applying the calibration values, determine whether any of the gain values for the plurality of receive antenna elements of the second polarization exceed a maximum receive gain of the analog beamforming transceiver and, if any of the gain values for the plurality of receive antenna elements of the second polarization exceed the maximum receive gain, normalize the gain values for the plurality of receive antenna elements of the second polarization and an inverse of the gain values for the plurality of transmit antenna elements of the second polarization with the maximum receive gain.

In some embodiments, the plurality of receive antenna elements of the first polarization are implemented on separate hardware than that of the plurality of transmit antenna elements of the second polarization.

In some embodiments, the plurality of receive antenna elements of the second polarization are implemented on separate hardware than that of the plurality of transmit antenna elements of the first polarization.

In some embodiments, the signals transmitted via the plurality of transmit antenna elements of the second polarization are live signals.

In some embodiments, the self-calibration subsystem is comprised in the analog beamforming transceiver. In some other embodiments, at least part of the self-calibration subsystem is implemented as one or more virtual components that are executing on one or more processing nodes in a network.

In some embodiments, an analog beamforming transceiver comprises a performing module, a computing module, and an applying module. The performing module is operable, for each receive antenna element of a plurality of receive antenna elements of a first polarization for each transmit beam direction of a plurality of transmit beam directions for a second polarization: transmit a signal in the transmit beam direction via a plurality of transmit antenna elements of the second polarization, and obtain a measurement value for a received signal received via the receive antenna element of the first polarization responsive to the signal transmitted in the first beam direction via the plurality of transmit antenna elements of the second polarization. The computing module is operable to compute calibration values for the plurality of receive antenna elements of the first polarization and calibration values for the plurality of transmit antenna elements of the second polarization based on the measurement values obtained for each of the plurality of receive antenna elements of the first polarization for each of the plurality of transmit beam directions for the second polarization and known coupling factors between the plurality of receive antenna elements of the first polarization and the plurality of transmit antenna elements of the second polarization. The applying module is operable to apply the calibration values for the plurality of receive antenna elements of the first polarization and the calibration values for the plurality of transmit antenna elements of the second polarization.

In some embodiments, a method of determining failed transmit antenna elements in an analog beamforming transceiver comprises, for each receive antenna element of a plurality of receive antenna elements of a first polarization for each transmit beam direction of a plurality of transmit beam directions for a second polarization: transmitting a signal in the transmit beam direction via a plurality of transmit antenna elements of a second polarization and obtaining a measurement value for a received signal received via the receive antenna element of the first polarization responsive to the signal transmitted in the first beam direction via the plurality of transmit antenna elements of the second polarization. The method further comprises computing calibration values for the plurality of receive antenna elements of the first polarization and calibration values for the plurality of transmit antenna elements of the second polarization based on the measurement values obtained for each of the plurality of receive antenna elements of the first polarization for each of the plurality of transmit beam directions for the second polarization and known coupling factors between the plurality of receive antenna elements of the first polarization and the plurality of transmit antenna elements of the second polarization. The method further comprises determining whether any of the plurality of transmit antenna elements of the second polarization have failed based on the calibration values computed for the plurality of transmit antenna elements of the second polarization.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed herein for self-calibration of an analog beamforming Advanced Antenna System (AAS) using at least two transceiver hardware layers (e.g., a hardware layer providing horizontal polarization and a separate hardware layer providing vertical polarization). Measurements used for self-calibration are performed on the fly (i.e., during transmission of actual, "live," data) to ensure minimum downtime. During calibration, for each measurement, multiple transmit antenna elements are active in one hardware layer and used for transmission of a signal, and a single receive antenna element is active in another hardware layer. The resulting measurements are used together with known coupling factors and known beam weighting factors to compute calibration values for each antenna element. By using measurements that are made while multiple transmit antenna elements are simultaneously active and used to transmit the signal, the number of overall measurements is very small, which results in fast calibration and limited downtime.

Figure 1:
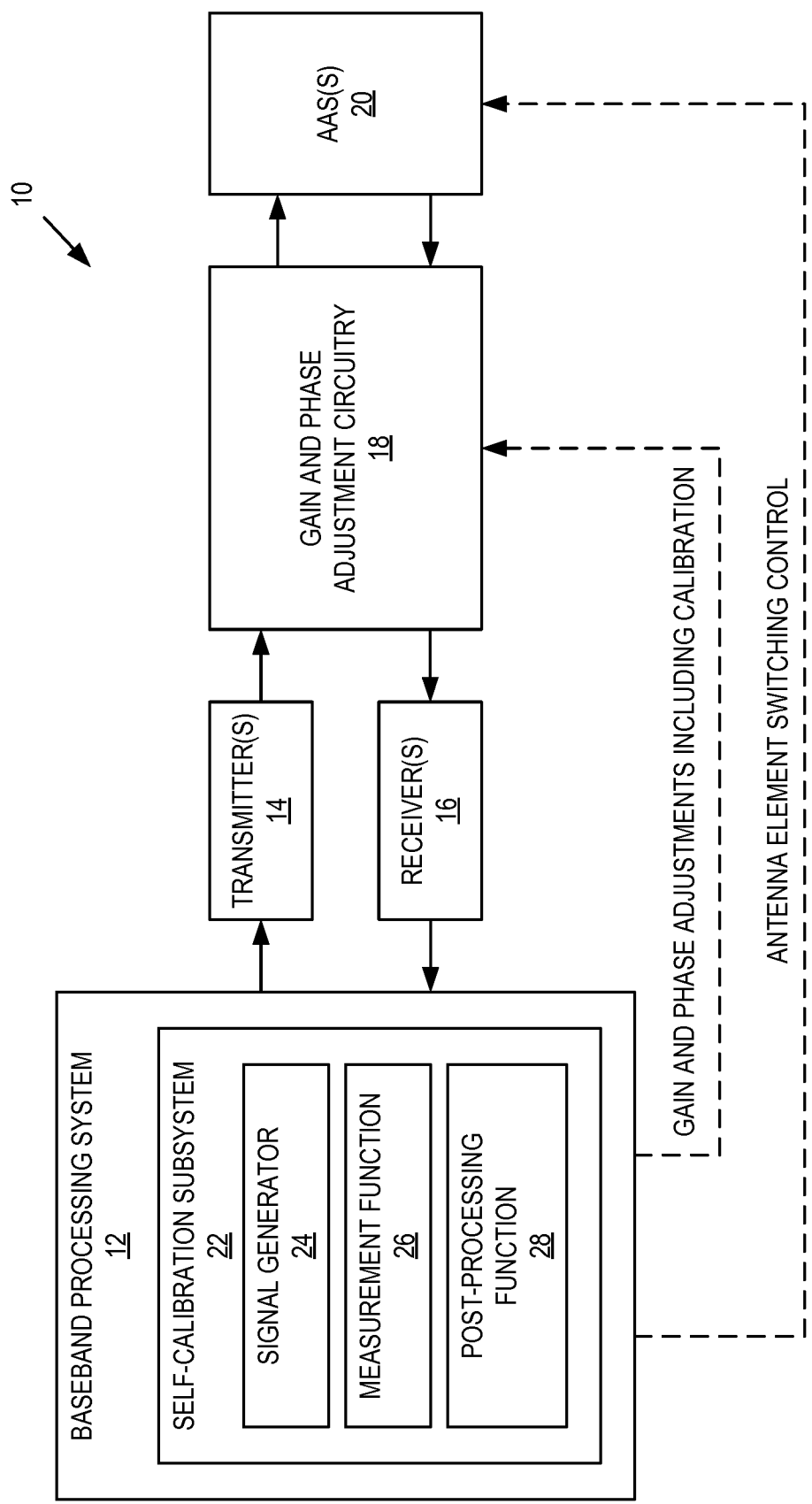
FIG. 1 illustrates an example embodiment of a transceiver that provides self-calibration for an antenna array of the transceiver according to embodiments of the present disclosure.

In this regard, FIG. 1 illustrates an example embodiment of a transceiver 10 that provides self-calibration for an antenna array of the transceiver 10 according to embodiments of the present disclosure. In some preferred embodiments, the transceiver 10 is an analog beamforming transceiver and, as such, the transceiver 10 is sometimes referred to herein as an analog beamforming transceiver 10. However, it should be appreciated that, in some other embodiments, the transceiver 10 may, e.g., be partly digital (i.e., hybrid). The analog beamforming transceiver 10 may be, for example, a radio access node in a cellular communications network (e.g., a Third Generation Partnership Project (3GPP) Long Term Evolution (LTE) or Fifth Generation (5G) New Radio (NR) network), an access point in a local wireless network (e.g., an access point in a WiFi network), a wireless communication device (e.g., a User Equipment device (UE) in a 3GPP LTE or Third Generation (3G) NR network), a car radar, or the like. As illustrated, the analog beamforming transceiver 10 includes a baseband processing system 12, one or more transmitters 14 and one or more receivers 16 coupled to the baseband processing system 12, gain and phase adjustment circuitry 18, and an antenna array that, in this example, is implemented as one or more AASs 20. The baseband processing system 12 is implemented in hardware or a combination of hardware and software. For example, the baseband processing system 12 may include one or more processors (e.g., Central Processing Units (CPUs), Digital Signal Processors (DSPs), Application Specific Integrated Circuits (ASICs), Field Programmable Gate Arrays (FPGAs), and/or the like). In some embodiments, at least some of the functionality of the baseband processing system 12 described herein is implemented in software that is executed by the processor(s).

While illustrated separately for clarity and ease of discussion, the gain and phase adjustment circuitry 18 may alternatively be implemented within the transmitter(s) 14 and receiver(s) 16. For example, the gain and phase adjustment circuitry 18 may be implemented within the transmitter(s) 14 and receiver(s) 16 such that gain and phase adjustments in the transmit path are performed prior to amplification by the power amplifier and gain and phase adjustments in the receive path are performed subsequent to amplification by the low noise amplifier.

The antenna array that is implemented by the one or more AASs 20 includes multiple antenna elements and, in some implementations, many antenna elements (e.g., tens or hundreds of antenna elements). When an antenna element is used for transmission from the transmitter(s) 14, the antenna element is referred to herein as a Transmit (Tx) antenna element. Likewise, when an antenna element is used for reception via the receiver(s) 16, the antenna element is referred to herein as a Receive (Rx) antenna element. In some implementations, a single antenna element may operate as both a Tx antenna element and a Rx antenna element. Due to various parameters (e.g., manufacturing tolerances of the various components in the transmit and receive paths, temperature, etc.), there may be variations in gain and/or phase between different Tx antenna elements and/or variations in gain and/or phase between different Rx antenna elements. Note that the gain and/or phase variation is not only an antenna property but also a property of the combination of the phase shifter, amplifier, and antenna. In particular, the gain and phase of a first transmit path from the output of the baseband processing system 12 to a first Tx antenna element may differ from that of a second transmit path from the output of the baseband processing system 12 to a second Tx antenna element. Likewise, the gain and phase of a first receive path from a first Rx antenna element to the input of the baseband processing system 12 may differ from that of a second receive path from a second Rx antenna element to the input of the baseband processing system 12.

The baseband processing system 12 includes a self-calibration subsystem 22 that operates to provide self-calibration at the analog beamforming transceiver 10 for the variations in gain and/or phase for different Tx and/or Rx antenna elements, as described in detail below. The self-calibration subsystem 22 is implemented in hardware or a combination of hardware and software. For example, the self-calibration subsystem 22 may include one or more processors (e.g., CPUs, DSPs, ASICs, FPGAs, and/or the like). In some embodiments, at least some of the functionality of the self-calibration subsystem 22 described herein is implemented in software that is executed by the processor(s). In this example, the self-calibration subsystem 22 includes a signal generator 24, a measurement function 26, and a post-processing function 28, the operation of which is described below in detail. Note that, in some embodiments, some or all of the components used for self-calibration can be dedicated for that purpose (i.e., not used for transmission or reception of normal uplink and downlink signals). Preferably, the self-calibration subsystem 22 performs on-the-fly self-calibration, in which case the signal generator 24 receives actual IQ data to be transmitted and outputs the received IQ data to the transmitter(s) 14 for transmission.

Before describing the operation of the self-calibration subsystem 22, a mathematical description of the gain and phase errors between different antenna branches for different polarizations is beneficial. Here, it is assumed that the AAS(s) 20 includes many antenna elements, groups of which are implemented on separate hardware (e.g., implemented as separate Radio Frequency Integrated Circuits (RFICs)). These separate hardware components (e.g., separate RFICs) are referred to herein as separate hardware layers. The hardware layers include at least one layer used for horizontal antenna polarization (simply referred to herein as horizontal polarization), and at least one layer used for vertical antenna polarization (simply referred to herein as vertical polarization).

Preferably, an initial antenna calibration procedure is performed, e.g., in the factory. This initial calibration may be performed using any suitable calibration technique such as an Over-the-Air (OTA) calibration technique in a defined, controlled environment. This initial calibration results in the gain and phases of all Tx antenna elements of the same polarization having the same gain and phase and all Rx antenna elements of the same polarization having the same gain and phase.

Figure 2:
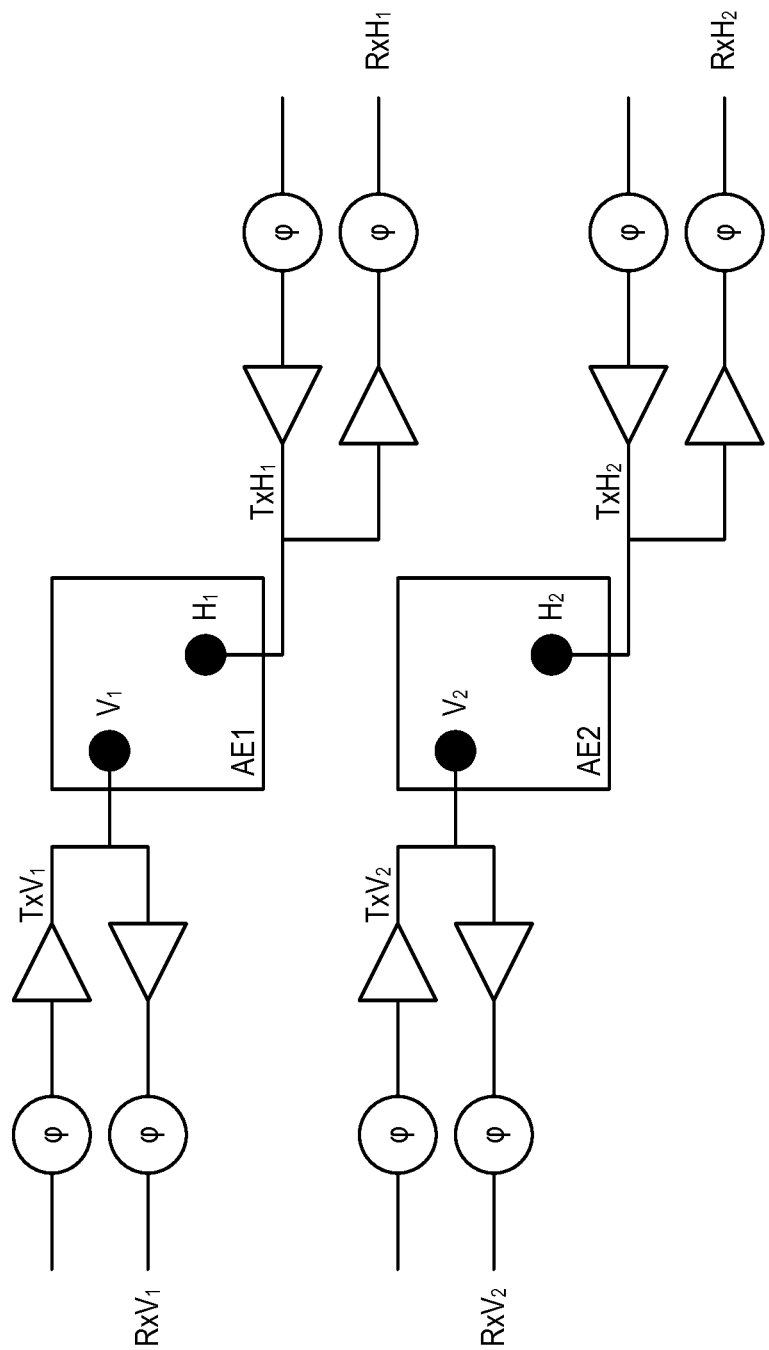
FIG. 2 illustrates an example of two antenna elements along with their associated gains and phases for two different polarizations.

As an example, two antenna elements are illustrated in FIG. 2 along with their associated gains and phases. A value $TxV_1$ is a complex number that is the product of the gain and phase of Tx antenna element 1 of the vertical ("V") polarization, a value $RxV_1$ is a complex number that is the product of the gain and phase of Rx antenna element 1 of the vertical polarization, $TxH_1$ is a complex number that is the product of the gain and phase of Tx antenna element 1 of the horizontal ("H") polarization, and a value $RxH_1$ is a complex number that is the product of the gain and phase of Rx antenna element 1 of the horizontal polarization. Likewise, a value $TxV_2$ is a complex number that is the product of the gain and phase of Tx antenna element 2 of the vertical polarization, a value $RxV_2$ is a complex number that is the product of the gain and phase of Rx antenna element 2 of the vertical polarization, $TxH_2$ is a complex number that is the product of the gain and phase of Tx antenna element 2 of the horizontal polarization, and a value $RxH_2$ is a complex number that is the product of the gain and phase of Rx antenna element 2 of the horizontal polarization.

After initial calibration, $$TxH_1 = TxH_2 = TxH_c, \tag{1a}$$

where $TxH_c$ is the calibrated value. Likewise, after initial calibration, $$TxV_1 = TxV_2 = TxV_c, \tag{1b}$$

$$RxH_1 = RxH_2 = RxH_c, \text{ and} \tag{1c}$$

$$RxV_1 = RxV_2 = RxV_c. \tag{1d}$$

However, during operation, an additional error occurs due to temperature gradients, changes in operating environment, aging of hardware elements, etc. It is this additional error that needs to be calibrated. Thus, during operation, the gain and phases of the antenna elements can be mathematically expressed as:

$$TxH_1 = TxH_c \cdot \delta TxH_1, \tag{2a}$$

$$TxH_2 = TxH_c \cdot \delta TxH_2, \tag{2b}$$

$$TxV_1 = TxV_c \cdot \delta TxV_1, \tag{2c}$$

$$TxV_2 = TxV_c \cdot \delta TxV_2, \tag{2d}$$

$$RxH_1 = RxH_c \cdot \delta RxH_1, \tag{2e}$$

$$RxH_2 = RxH_c \cdot \delta RxH_2, \tag{2f}$$

$$RxV_1 = RxV_c \cdot \delta RxV_1, \text{ and} \tag{2g}$$

$$RxV_2 = RxV_c \cdot \delta RxV_2, \tag{2h}$$

where $\delta TxH_1$ is the error term to be calibrated (i.e., corrected) for Tx antenna element 1 for the horizontal polarization, $\delta TxH_2$ is the error term to be calibrated (i.e., corrected) for Tx antenna element 2 for the horizontal polarization, $\delta TxV_1$ is the error term to be calibrated (i.e., corrected) for Tx antenna element 1 for the vertical polarization, $\delta TxV_2$ is the error term to be calibrated (i.e., corrected) for Tx antenna element 2 for the vertical polarization, $\delta RxH_1$ is the error term to be calibrated (i.e., corrected) for Rx antenna element 1 for the horizontal polarization, $\delta RxH_2$ is the error term to be calibrated (i.e., corrected) for Rx antenna element 2 for the horizontal polarization, $\delta RxV_1$ is the error term to be calibrated (i.e., corrected) for Rx antenna element 1 for the vertical polarization, and $\delta RxV_2$ is the error term to be calibrated (i.e., corrected) for Rx antenna element 2 for the vertical polarization.

Further, when beamforming is used, the gain and phase of each antenna element is effectively multiplied by a complex beamforming weight factor w. Thus, using two beams as an example, the amplitude and gains for the various antenna branches when beamforming is used can be mathematically represented as:

Tx AE1, Horizontal Polarization:

Beam 1 (BHT1): $TxH_1 = TxH_c \cdot \delta TxH_1 \cdot w_{BHT1,TxH_1}$ (3a)

Beam 2 (BHT2): $TxH_1 = TxH_c \cdot \delta TxH_1 \cdot w_{BHT2,TxH_1}$ (3b)

where $$w_{BHT1,TxH_1} = G_{BHT1,TxH_1} \cdot e^{j\varphi_{BHT1,TxH_1}}$$

is the beamforming weight for Tx AE1 of the horizontal polarization for beam 1 and is a product of a respective gain value ($G_{BHT1,TxH_1}$) and a respective phase value $$w_{BHT2,TxH_1} = G_{BHT2,TxH_1} \cdot e^{j\varphi_{BHT2,TxH_1}}$$

is the beamforming weight for Tx AE1 of the horizontal polarization for beam 2 and is a product of a respective gain value ($G_{BHT2,TxH_1}$) and a respective phase value ($\varphi_{BHT2,TxH_1}$).

Tx AE2, Horizontal Polarization:

Beam 1 (BHT1): $TxH_2 = TxH_c \cdot \delta TxH_2 \cdot w_{BHT1,TxH_2}$ (3c)

Beam 2 (BHT2): $TxH_2 = TxH_c \cdot \delta TxH_2 \cdot w_{BHT2,TxH2}$ (3d)

where $$w_{BHT1,TxH_2} = G_{BHT1,TxH_2} \cdot e^{j\varphi_{BHT1,TxH_2}}$$

is the beamforming weight for Tx AE2 of the horizontal polarization for beam 1 and is a product of a respective gain value ($G_{BHT1,TxH_2}$) and a respective phase value ($\varphi_{PBHT1,TxH_2}$) and $$w_{BHT2,TxH_2} = G_{BHT2,TxH_2} \cdot e^{j\varphi_{BHT2,TxH_2}}$$

is the beamforming weight for Tx AE2 of the horizontal polarization for beam 2 and is a product of a respective gain value ($G_{BHT2,TxH_2}$) and a respective phase value ($\varphi_{BHT2,TxH_2}$).

Tx AE1, Vertical Polarization:

Beam 1 (BVT1): $TxV_1 = TxV_c \cdot \delta TxV_1 \cdot w_{BvT1,TxV_1}$ (3e)

Beam 2 (BVT2): $TxV_1 = TxV_c \cdot \delta TxV_1 \cdot w_{BVT2,TxV_1}$ (3f)

where $$w_{BVT1,TxV_1} = G_{BVT1,TxV_1} \cdot e^{j\varphi_{BVT1,TxV_1}}$$

is the beamforming weight for Tx AE1 of the vertical polarization for beam 1 and is a product of a respective gain value ($G_{BVT1,TxV_1}$) and a respective phase value ($\varphi_{BVT1,TxV_1}$), and $$w_{BVT2,TxV_1} = G_{BVT2,TxV_1} \cdot e^{j\varphi_{BVT2,TxV_1}}$$

is the beamforming weight for Tx AE1 of the vertical polarization for beam 2 and is a product of a respective gain value ($G_{BVT2,TxV_1}$) and a respective phase value ($\varphi_{BVT2,TxV_1}$).

Tx AE2, Vertical Polarization:

Beam 1 (BVT1): $TxV_2 = TxV_c \cdot \delta TxV_2 \cdot w_{BVT1,TxV_2}$ (3g)

Beam 2 (BVT2): $TxV_2 = TxH_c \cdot \delta TxV_2 \cdot w_{BVT2,TxV_2}$ (3h)

where $$w_{BVT1,TxV_2} = G_{BVT1,TxV_2} \cdot e^{j\varphi_{BVT1,TxV_2}}$$

is the beamforming weight for Tx AE2 of the vertical polarization for beam 1 and is a product of a respective gain value ($G_{BVT1,TxV_2}$) and a respective phase value ($\varphi_{BVT1,TxV_2}$), and $$w_{BVT2,TxV_2} = G_{BVT2,TxV_2} \cdot e^{j\varphi_{BVT2,TxV_2}}$$

is the beamforming weight for Tx AE2 of the vertical polarization for beam 2 and is a product of a respective gain value ($G_{BVT2,TxV_2}$) and a respective phase value ($\varphi_{BVT2,TxV_2}$).

Rx AE1, Horizontal Polarization:

Beam 1 (BHR1): $RxH_1 = RxH_c \cdot \delta RxH_1 \cdot w_{BHR1,RxH_1}$ (3i)

Beam 2 (BHR2): $RxH_1 = RxH_c \cdot \delta RxH_1 \cdot w_{BHR2,RxH_1}$ (3j)

where $$w_{BHR1,RxH_1} = G_{BHR1,RxH_1} \cdot e^{j\varphi_{BHR1,RxH_1}}$$

is the beamforming weight for Rx AE1 of the horizontal polarization for beam 1 and is a product of a respective gain value ($G_{BHR1,RxH_1}$) and a respective phase value $$w_{BHR2,RxH_1} = G_{BHR2,RxH_1} \cdot e^{j\varphi_{BHR2,RxH_1}}$$

is the beamforming weight for Rx AE1 of the horizontal polarization for beam 2 and is a product of a respective gain value ($G_{BHR2,RxH_1}$) and a respective phase value ($\varphi_{BHR2,RxH_1}$).

Rx AE2, Horizontal Polarization:

Beam 1 (BHR1): $RxH_2 = RxH_c \cdot \delta RxH_2 \cdot w_{BHR1,RxH_2}$ (3k)

Beam 2 (BHR2): $RxH_2 = RxH_c \delta RxH_2 \cdot w_{BHR2,RxH_2}$ (3l)

where $$w_{BHR1,RxH_2} = G_{BHR1,RxH_2} \cdot e^{j\varphi_{BHR1,RxH_2}}$$

is the beamforming weight for Rx AE2 of the horizontal polarization for beam 1 and is a product of a respective gain value ($G_{BHR1,RxH_2}$) and a respective phase value ($\varphi_{BHR1,RxH_2}$), and $$w_{BHR2,RxH_2} = G_{BHR2,RxH_2} \cdot e^{j\varphi_{BHR2,RxH_2}}$$

is the beamforming weight for Rx AE2 of the horizontal polarization for beam 2 and is a product of a respective gain value ($G_{BHR2,RxH_2}$) and a respective phase value ($\varphi_{BHR2,RxH_2}$)

Rx AE1, Vertical Polarization:

Beam 1 (BVR1): $RxV_1 = RxV_c \cdot \delta RxV_1 \cdot w_{BVR1,RxV_1}$ (3m)

Beam 2 (BVR2): $RxV_1 = RxV_c \cdot \delta RxV_1 \cdot w_{BVR2,RxV_1}$ (3n)

where $$w_{BVR1,RxV_1} = G_{BVR1,RxV_1} \cdot e^{j\varphi_{BVR1,RxV_1}}$$

is the beamforming weight for Rx AE1 of the vertical polarization for beam 1 and is a product of a respective gain value ($G_{BVR1,RxV_1}$) and a respective phase value ($\alpha_{BVR1,RxV_1}$), and $$w_{BVR2,RxV_1} = G_{BVR2,RxV_1} \cdot e^{j\varphi_{BVR2,RxV_1}}$$

is the beamforming weight for Rx AE1 of the vertical polarization for beam 2 and is a product of a respective gain value ($G_{BVR2,RxV_1}$) and a respective phase value ($\varphi_{BVR2,RxV_1}$).

Rx AE2, Vertical Polarization:

Beam 1 (BVR1): $RxV_2 = RxV_c \cdot \delta RxV_2 \cdot w_{BVR1,RxV_2}$ (3o)

Beam 2 (BVR2): $RxV_2 = RxV_c \cdot \delta RxV_2 \cdot w_{BVR2,RxV_2}$ (3p)

where $$w_{BVR1,RxV_2} = G_{BVR1,RxV_2} \cdot e^{j\varphi_{BVR1,RxV_2}}$$

is the beamforming weight for Rx AE2 of the vertical polarization for beam 1 and is a product of a respective gain value ($G_{BVR1,RxV_2}$) and a respective phase value ($\varphi_{BVR1,RxV_2}$), and $$w_{BVR2,RxV_2} = G_{BVR2,RxV_2} \cdot e^{j\varphi_{BVR2,RxV_2}}$$

is the beamforming weight for Rx AE2 of the vertical polarization for beam 2 and is a product of a respective gain value ($G_{BVR2,RxV_2}$) and a respective phase value ($\varphi_{BVR2,RxV_2}$). The weighting factors for beamforming are known from production calibration, which is recorded to create a beam linked to the beam index.

It is assumed, when the calibration is needed, that the absolute value of the elements phase and gain is changed but the relative phase and gain change is negligible to set proper weighting factor between beams.

Now, for a condition when only Tx antenna elements of the horizontal polarization are transmitting and one-by-one the Rx antenna elements of the vertical polarization are receiving (i.e., receiving the transmitted signal via coupling between the Tx and Rx antenna elements), the measured signals received at the Rx antenna elements of the vertical polarization can be mathematically described as follows.

For Rx AE1 of the vertical polarization receiving and the example two TX AE example described above, the received signal that is received via the Rx AE1 of the vertical polarization can be defined as:

$$D_{RxV_1} = S_{BHT} \cdot TxH_1 \cdot C_{TxH_1 RxV_1} \cdot RxV_1 + S_{BHT} \cdot TxH_2 \cdot C_{TxH_2 RxV_1} \cdot RxV_1 \quad (4)$$

where $C_{TxH_1 RxV_1}$ and $C_{TxH_2 RxV_1}$ are the cross polarization antenna coupling factors between Rx AE1 of the vertical polarization and Tx AE1 and Tx AE2 of the horizontal coupling, respectively. These cross-polarization antenna coupling factors are known, e.g., from production calibration or measurement. $S_{BHT}$ is the signal transmitted via Tx AE1 and Tx AE2 of the horizontal polarization. $D_{RxV_1}$ is the signal received via Rx AE1 of the vertical polarization.

From Equations (3a)-(3p) and Equation (4):

$$D_{BHT1,BVR1,RxV_1} = S_{BHT} \cdot TxH_c \cdot \delta Tx H_1 \cdot w_{BHT1,TxH_1} \cdot C_{TxV_1 RxV_1} \cdot RxV_c \cdot \delta RxV_1 \cdot w_{BVR1,RxV_1} + S_{BHT} \cdot TxH_c \cdot \delta Tx H_2 \cdot w_{BHT1,TxH_2} \cdot C_{TxH_2 RxV_1} \cdot RxV_c \cdot \delta RxV_1 \cdot w_{BVR1,RxV_1}$$

which can be rewritten as:

$$D_{BHT1,BVR1,RxV_1} = S_{BHT} \cdot TxH_c \cdot RxV_c \cdot \delta RxV_1 \\ (\delta TxH_1 \cdot w_{BHT1,TxH_1} \cdot C_{TxV_1 RxV_1} \cdot w_{BVR1,RxV_1} + \\ \delta TxH_2 \cdot w_{BHT1,TxH_2} \cdot C_{TxV_2 RxV_1} \cdot w_{BVR1,RxV_1}) \quad (5)$$

$$\frac{D_{BHT1,BVR1,RxV_1}}{S_{BHT} \cdot TxH_c \cdot RxV_c \cdot \delta RxV_1} = \\ \begin{bmatrix} w_{BHT1,TxH_1} \cdot & w_{BHT1,TxH_2} \cdot \\ C_{TxV_1 RxV_1} \cdot w_{BVR1,RxV_1} & C_{TxV_2 RxV_1} \cdot w_{BVR1,RxV_1} \end{bmatrix} \begin{bmatrix} \delta TxH_1 \\ \delta TxH_2 \end{bmatrix}$$

or $$\frac{M_{BHT1,BVR1,RxV_1}}{\delta RxV_1} = \quad (6)$$

$$\begin{bmatrix} w_{BHT1,TxH_1} \cdot & w_{BHT1,TxH_2} \cdot \\ C_{TxV_1 RxV_1} \cdot w_{BVR1,RxV_1} & C_{TxV_2 RxV_1} \cdot w_{BVR1,RxV_1} \end{bmatrix} \begin{bmatrix} \delta TxH_1 \\ \delta TxH_2 \end{bmatrix}$$

where $$M_{BHT1,BVR1,RxV_1} = \frac{D_{BHT1,BVR1,RxV_1}}{S_{BHT} \cdot TxH_c \cdot RxV_c}$$

Similarly, for Rx AE2 of the vertical polarization, $$\frac{M_{BHT1,BVR1,RxV_2}}{\delta RxV_2} = \quad (7)$$

$$\begin{bmatrix} w_{BHT1,TxH_1} \cdot & w_{BHT1,TxH_2} \cdot \\ C_{TxV_1 RxV_1} \cdot w_{BVR1,RxV_1} & C_{TxV_2 RxV_1} \cdot w_{BVR1,RxV_1} \end{bmatrix} \begin{bmatrix} \delta TxH_1 \\ \delta TxH_2 \end{bmatrix}$$

Equations (6) and (7) can be combined to provide:

$$\begin{bmatrix} w_{BHT1,TxH_1} \cdot C_{TxV_1RxV_1} \cdot w_{BVR1,RxV_1} & w_{BHT1,TxH_2} \cdot C_{TxV_2RxV_1} \cdot w_{BVR1,RxV_1} \\ w_{BHT1,TxH_1} \cdot C_{TxV_1RxV_2} \cdot w_{BVR1,RxV_2} & w_{BHT1,TxH_2} \cdot C_{TxV_2RxV_2} \cdot w_{BVR1,RxV_2} \end{bmatrix} \cdot \quad (8)$$

$$\begin{bmatrix} \delta TxH_1 \\ \delta TxH_2 \end{bmatrix} = \begin{bmatrix} \dfrac{M_{BHT1,BVR1,RxV_1}}{\delta RxV_1} \\ \dfrac{M_{BHT1,BVR_1,RxV_2}}{\delta RxV_2} \end{bmatrix}$$

For two Tx beam directions (BHT1 and BHT2) for the horizontal polarization beam directions, $$\begin{bmatrix} w_{BHT1,TxH_1} \cdot & w_{BHT1,TxH_2} \cdot \\ C_{TxV_1RxV_1} \cdot w_{BVR1,RxV_1} & C_{TxV_2RxV_1} \cdot w_{BVR1,RxV_1} \\ w_{BHT1,TxH_1} \cdot & w_{BHT1,TxH_2} \cdot \\ C_{TxV_1RxV_2} \cdot w_{BVR1,RxV_2} & C_{TxV_2RxV_2} \cdot w_{BVR1,RxV_2} \\ w_{BHT2,TxH_1} \cdot & w_{BHT2,TxH_2} \cdot \\ C_{TxV_1RxV_1} \cdot w_{BVR1,RxV_1} & C_{TxV_2RxV_1} \cdot w_{BVR1,RxV_1} \\ w_{BHT2,TxH_1} \cdot & w_{BHT2,TxH_2} \cdot \\ C_{TxV_1RxV_2} \cdot w_{BVR1,RxV_2} & C_{TxV_2RxV_2} \cdot w_{BVR1,RxV_2} \end{bmatrix} \cdot \begin{bmatrix} \delta TxH_1 \\ \delta TxH_2 \end{bmatrix} = \quad (9)$$

-continued $$\begin{bmatrix} \dfrac{M_{BHT1,BVR1,RxV_1}}{\delta RxV_1} \\ \dfrac{M_{BHT1,BVR1,RxV_2}}{\delta RxV_2} \\ \dfrac{M_{BHT2,BVR1,RxV_1}}{\delta RxV_1} \\ \dfrac{M_{BHT2,BVR1,RxV_2}}{\delta RxV_2} \end{bmatrix}$$

Looking at Equation 9, the beamforming weights and coupling factors are known, and the measured values (i.e., $M_{BHT1,BVR1,RxV_1}$, $M_{BHT1,BVR1,RxV_2}$, $M_{BHT2,BVR1,RxV_1}$, and $M_{BHT2,BVR1,RxV_2}$) are measurements actually obtained and therefore known. The error values $\delta TxH_1$, $\delta TxH_2$, $\delta RxV_1$, and $\delta RxV_2$ are unknown.

Equation (9) can be solved using any suitable technique to determine the error values $\delta TxH_1$, $\delta TxH_2$, $\delta RxV_1$, and $\delta RxV_2$. One example technique for solving Equation (9) is the Newton Rhapson method.

Note that Equations (4) through (9) illustrate an example mathematical representation of how the error values can be determined for a two Tx, horizontal polarization and a two Rx, vertical scenario. Note that these equations can be extended for any number of Tx AEs of a first polarization and any number of Rx AEs of a second polarization. Further, the selection of number of beam directions and number of measurement receivers depends on the number of unknowns (i.e., the number of correction values needed to be solved for) and the corresponding strategy to get an underdetermined or over-determined solution.

In this regard, Equation (9) can be generalized and rewritten as:

$$\begin{bmatrix} w_{BHT1,TxH_1} \cdot & \cdots & w_{BHT1,TxH_N} \cdot & -M_{BHT1,BVR1,RxV_1} & \vdots & 0 \\ C_{TxV_1RxV_1} \cdot w_{BVR1,RxV_1} & & C_{TxV_NRxV_1} \cdot w_{BVR1,RxV_1} & & & \\ \vdots & \cdots & \vdots & 0 & \vdots & \vdots \\ w_{BHT1,TxH_1} \cdot & \cdots & w_{BHT1,TxH_N} \cdot & 0 & \vdots & -M_{BHT1,BVR1,RxV_N} \\ C_{TxV_1RxV_N} \cdot w_{BVR1,RxV_N} & & C_{TxV_NRxV_N} \cdot w_{BVR1,RxV_N} & & & \\ \vdots & \vdots & \vdots & -M_{BHT\_b,BVR\_R,RxV_1} & \vdots & 0 \\ \vdots & \vdots & \vdots & \vdots & \vdots & \vdots \\ w_{BHT\_b,TxH_1} \cdot & & w_{BHT\_b,TxH_N} \cdot & & \vdots & -M_{BHT\_b,BVR\_b,RxV_N} \\ C_{TxV_1RxV_N} \cdot w_{BVR\_b,RxV_N} & & C_{TxV_NRxV_N} \cdot w_{BVR\_b,RxV_N} & & & \\ 0 & \vdots & 0 & 1 & \vdots & 0 \end{bmatrix} \cdot \begin{bmatrix} \delta TxH_1 \\ \delta TxH_2 \\ \vdots \\ \delta TxH_i \\ \dfrac{1}{\delta RxV_1} \\ \dfrac{1}{\delta RxV_2} \\ \vdots \\ \dfrac{1}{\delta RxV_k} \end{bmatrix} = \begin{bmatrix} 0 \\ 0 \\ \vdots \\ 0 \\ \vdots \\ 1 \end{bmatrix} \quad (10)$$

The solution should be over-deterministic. As one example, for an 8×8 array there will be $N_U = 2 \times 64$ unknown. In the presence of known $\delta RxV_1 = 1$ and $N_B = 56$ beam directions, there will be $N_m = N_B \cdot N + 1 = 3585$ number of equations to solve. These equations can be solved using, e.g., the non-linear Newton Raphson method in an iterative way or the non-linear least square method.

The following describes processes utilized by the self-calibration subsystem 22 to perform measurements and to utilize the measurements along with known antenna coupling factors and beamforming weights to determine the calibration errors in reference to that of a reference Rx AE (e.g., $RxV_1$).

Figure 3:
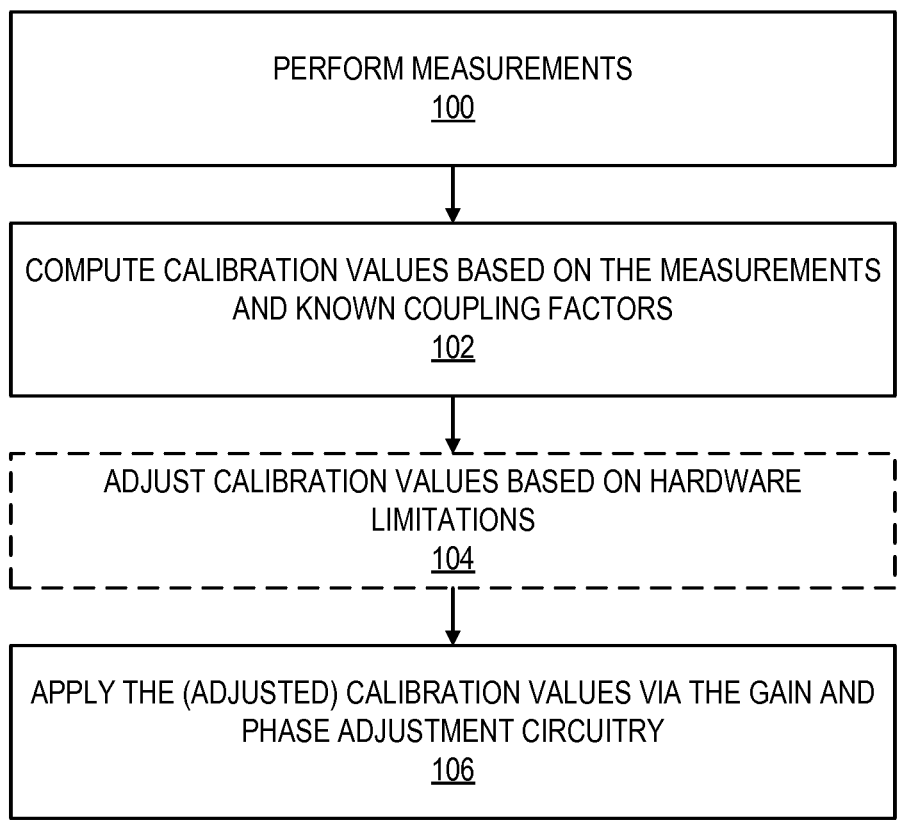
FIG. 3 is a flow chart that illustrates the operation of the self-calibration subsystem of FIG. 1 according to some embodiments of the present disclosure.

In this regard, FIG. 3 is a flow chart that illustrates the operation of the self-calibration subsystem 22 of FIG. 1 according to some embodiments of the present disclosure. Optional steps are represented by dashed lines. As illustrated, the self-calibration subsystem 22 performs measurements (M) (step 100). More specifically, for each receive antenna element of at least a subset of all Rx antenna elements of a first polarization (e.g., the vertical polarization) and for each transmit beam direction of at least a subset of all transmit beam directions for a second polarization (e.g., the horizontal polarization), the signal generator 24 provides a signal to the transmitters 14 for transmission in the transmit beam direction via at least a subset of all Tx antenna elements of the second polarization and the measurement function 26 obtains a measurement value for a received signal received via the Rx antenna element of the first polarization responsive to the transmission of the signal. As an example, for a given Rx antenna element of the vertical polarization ($AE_{RxVi}$), the self-calibration subsystem 22 simultaneously transmits a signal in a given beam direction ($BHT_j$) via multiple (possibly all) Tx antenna elements of the horizontal polarization ($AE_{TxHk}$ for k=1, 2, ... ). Due to the cross-polarization antenna coupling, a resulting signal is received via the Rx antenna element $AE_{RxVi}$. This received signal is measured by the measurement function 26 to provide a measurement value ($M_{BHTj,BVR1,RxVi}$), assuming Rx beam BVR1. This process is repeated for multiple beams for each of multiple Rx AEs to obtain a set of measurements. As noted above, the number of beam directions and number of measurement receivers used to obtain the measurements depends on the number of unknowns (i.e., the number of correction values needed to be solved for).

The post-processing function 28 computes calibration values based on the measurements obtained in step 100 and known coupling factors between the antenna elements (step 102). In addition, the known beam weights are also used. For instance, the measurements and known values are inserted into Equation (10) above, and Equation (10) is solved using any suitable technique (e.g., the Newton Raphson method) to compute the error values. The calibration values are then computed as values that correct for the computed error values. The known values may be obtained from, e.g., memory at the transceiver 10. Optionally, the self-calibration subsystem 22 adjusts the computed calibration values based on hardware limitations of, e.g., the gain and phase adjustment circuitry 18 (e.g., based on a maximum allowable Tx gain and/or a maximum allowable Rx gain) (step 104). The self-calibration subsystem 22 applies the computed (and optionally adjusted) calibration values via the gain and phase adjustment circuitry 18 (step 106).

Figure 4:
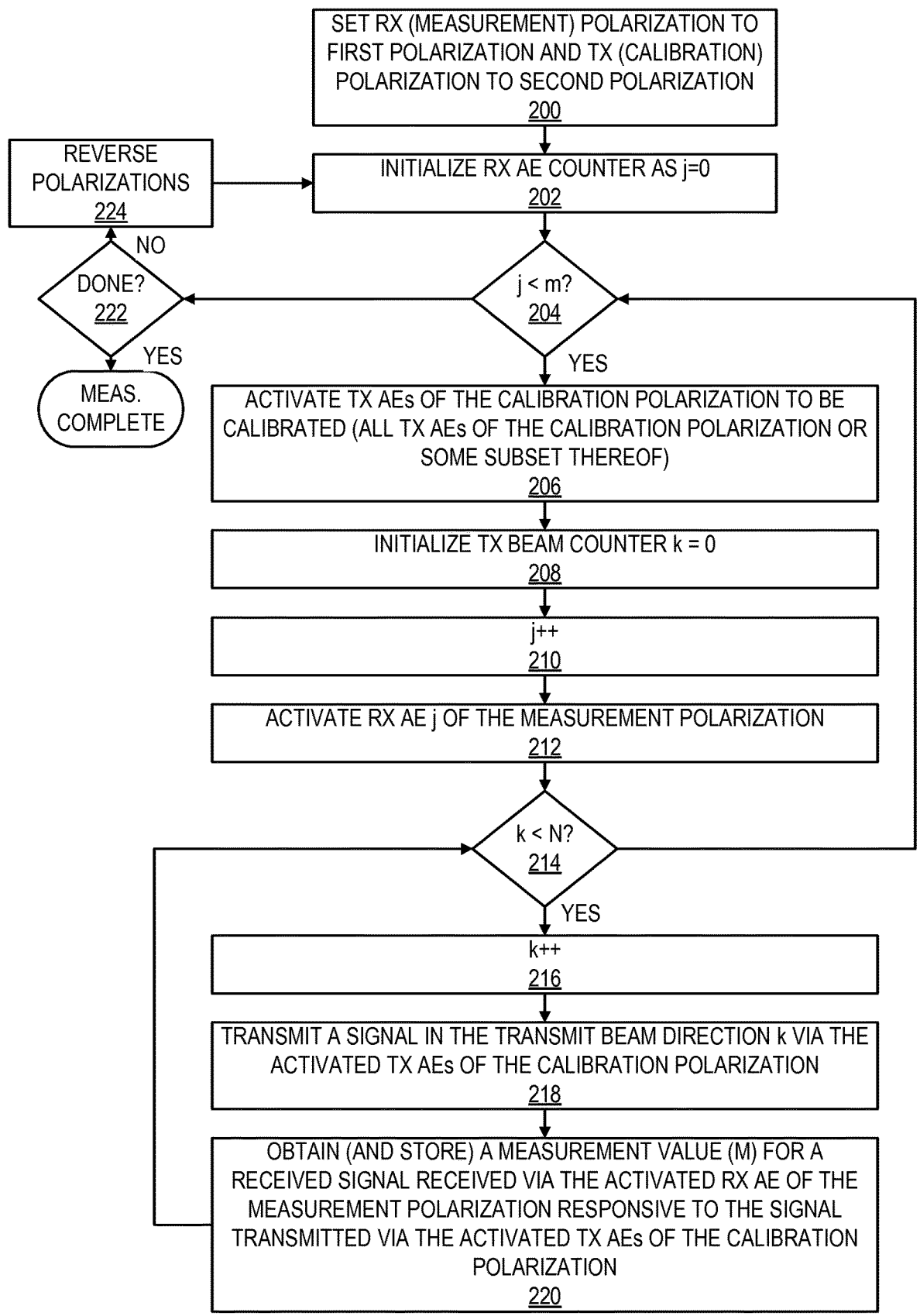
FIG. 4 is a flow chart that illustrates step 100 of FIG. 3 in more detail according to some embodiments of the present disclosure.

FIG. 4 is a flow chart that illustrates step 100 of FIG. 3 in more detail according to some embodiments of the present disclosure. This process is performed by the self-calibration subsystem 22 and, in particular, the measurement function 26 and the signal generator 24. As illustrated, the self-calibration subsystem 22 sets a Rx, or measurement, polarization to a first polarization (e.g., the vertical polarization) and a Tx, or calibration, polarization to a second polarization (e.g., the horizontal polarization) (step 200). The self-calibration subsystem 22 initializes a Rx antenna element counter j to 0 (step 202).

The self-calibration subsystem 22 determines whether the Rx antenna element counter j is less than a value m, where m is the number of Rx antenna elements of the first polarization to be used for measurement (step 204). The value m is greater than or equal to 2, depending on the particular implementation and the number of unknowns. The value of m will increase the number of equations in the set of equations expressed in Equation (10) above and thus will give an overdetermined solution. If j is less than m (step 204, YES), the self-calibration subsystem 22 activates multiple Tx antenna elements of the calibration polarization (step 206). The number of Tx antenna elements of the calibration polarization that are activated can be a subset of or all of the Tx antenna elements of the calibration polarization. The self-calibration subsystem 22 also initializes a Tx beam counter k to 0 (step 208) and increments the Rx antenna element counter j (step 210). The self-calibration subsystem 22 also activates Rx antenna element j of the measurement polarization (step 212).

The self-calibration subsystem 22 determines whether a Tx beam direction counter k is less than a value N, where N is the number of Tx beam directions to be used for measurement (step 214). The value of N may be any value, i.e., less than, equal to, or greater than a total number of Tx beam directions for the calibration polarization. Note that the set of all possible Tx beam directions for the horizontal polarization may or may not be the same as the set of all possible Tx beam directions for the vertical polarization, depending on the particular implementation. If k is less than N (step 214, YES), the self-calibration subsystem 22 increments the Tx beam direction counter k (step 216) and transmits a complex (i.e., IQ) signal (S) in the Tx beam direction k for the calibration polarization via the activated Tx antenna elements of the calibration polarization (step 218). The signal (S) is preferably a "live" signal transmitted by the transceiver 10 over a full bandwidth of the transceiver 10. As used herein, a "live" signal is a signal that conveys actual data to a receiver (e.g., a wireless device (e.g., a UE) in the case where the transceiver 10 is a base station in a cellular communications network). The self-calibration subsystem 22 then obtains and stores a measurement value (M) for a received signal that is received via the activated Rx antenna element j of the measurement polarization in response to the signal transmitted via the activated Tx antenna elements of the calibration polarization (step 220). The measurement value (M) is preferably a normalized measurement value, e.g., computed as a ratio of a pre-normalization measurement value and the transmitted signal. The process then returns to step 214 and is repeated for N Tx beam directions.

Once the Tx beam direction counter k is not less than N (step 214, NO), the process returns to step 204 and is repeated for the next Rx antenna element. In this manner, measurements are obtained for each of the m Rx antenna elements for each of the N Tx beam directions. Once the Rx antenna element counter j is not less than m (step 204, NO), the self-calibration subsystem 22 determines whether measurements have been obtained for both polarizations (step 222). If not (step 222, NO), the self-calibration subsystem 22 reverses the polarizations (i.e., sets the measurement polarization to the second polarization and the calibration polarization to the first polarization) (step 224), and the process returns to step 202 and is repeated for the reversed polarizations. Once measurements have been obtained for both polarizations (step 222, YES), measurement is complete. The measurements are then used along with the known antenna coupling factors and beam weights to compute the calibration values for the Tx and Rx antenna elements in accordance with Equation (10) above.

Figure 5:
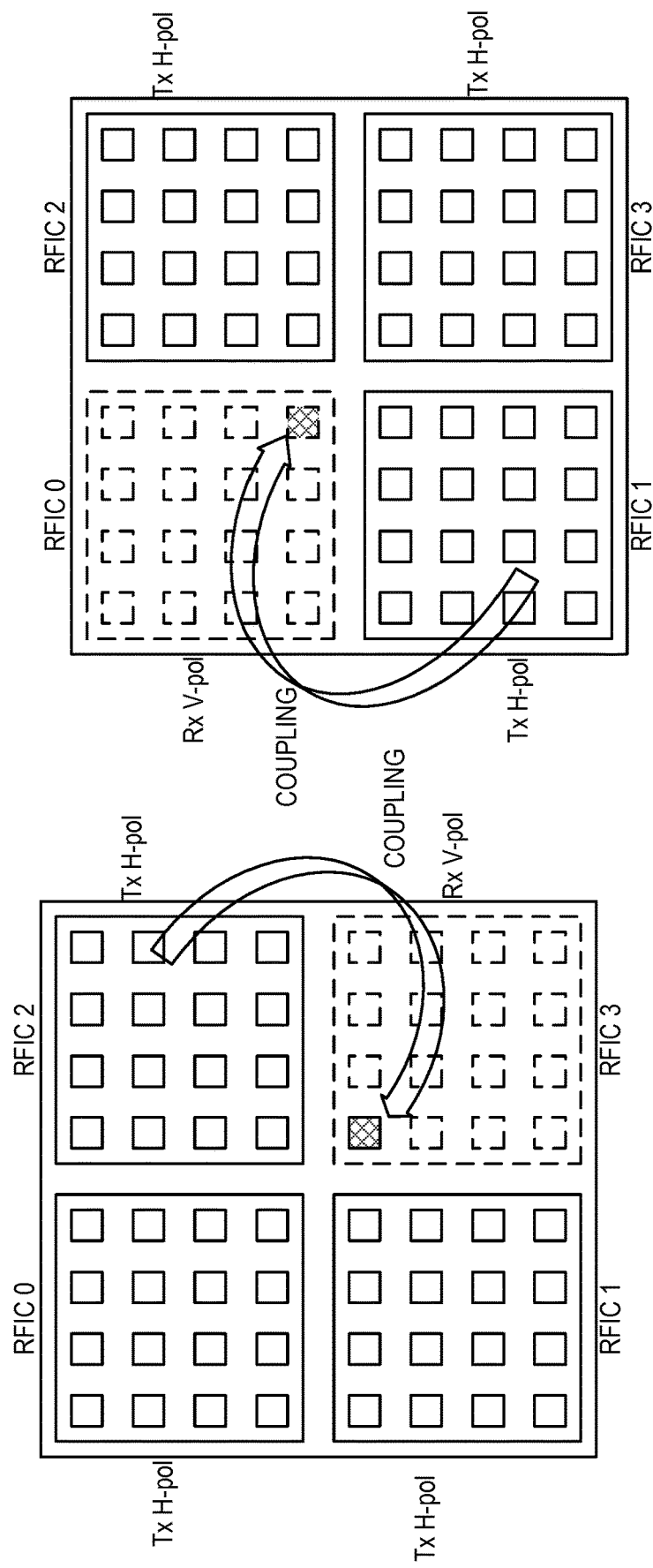
FIG. 5 illustrates one example of the Advanced Antenna System (AAS) of FIG. 1 and the setting and changing of the receive antenna element used for measurement in the measurement process described in FIG. 4 according to some embodiments of the present disclosure.

FIG. 5 illustrates one example of the AAS 20 and the setting and changing of the Rx antenna element used for measurement in the measurement process described above according to some embodiments of the present disclosure. As illustrated, the AAS 20 is, in this example, implemented by four RFICs, RFIC 0 to RFIC 3. On the left-hand side of FIG. 5, the AAS 20 is configured such that the RFIC 0 consists of a first set of Tx antenna elements of the horizontal polarization, RFIC 1 consists of a second set of Tx antenna elements of the horizontal polarization, RFIC 2 consists of a third set of Tx antenna elements of the horizontal polarization, and RFIC 3 includes a set of Rx antenna elements of the vertical polarization. A first measurement is obtained, in this example, by activating all of the Tx antenna elements of the horizontal polarization on RFIC 0, RFIC 1, and RFIC 2, activating one of the Rx antenna elements of the vertical polarization on RFIC 3, transmitting a known signal via all of the activated Tx antenna elements of the horizontal polarization, and obtaining a measurement of the resulting received signal received via the activated Rx element of the vertical polarization. This process may be repeated for one or more (and potentially all) of the Rx antenna elements of the vertical polarization on RFIC 3.

The right-hand side of FIG. 5 illustrates the AAS 20 after reconfiguration for another measurement(s). Here, the AAS 20 is configured such that the RFIC 1 consists of a first set of Tx antenna elements of the horizontal polarization, RFIC 2 consists of a second set of Tx antenna elements of the horizontal polarization, RFIC 3 consists of a third set of Tx antenna elements of the horizontal polarization, and RFIC 0 includes a set of Rx antenna elements of the vertical polarization. A first measurement is obtained, in this example, by activating all of the Tx antenna elements of the horizontal polarization on RFIC 1, RFIC 2, and RFIC 3, activating one of the Rx antenna elements of the vertical polarization on RFIC 0, transmitting a known signal via all of the activated Tx antenna elements of the horizontal polarization, and obtaining a measurement of the resulting received signal received via the activated Rx element of the vertical polarization. This process may be repeated for one or more (and potentially all) of the Rx antenna elements of the vertical polarization on RFIC 0. This process may further continue by further re-configuring the AAS 20 such that the Rx antenna elements of the vertical polarization on are RFIC 1 and again reconfigured such that the Rx antenna elements of the vertical polarization are on RFIC 2. Still further, additional measurements may be performed by reversing the measurement and calibration polarizations, as described above.

Figure 6:
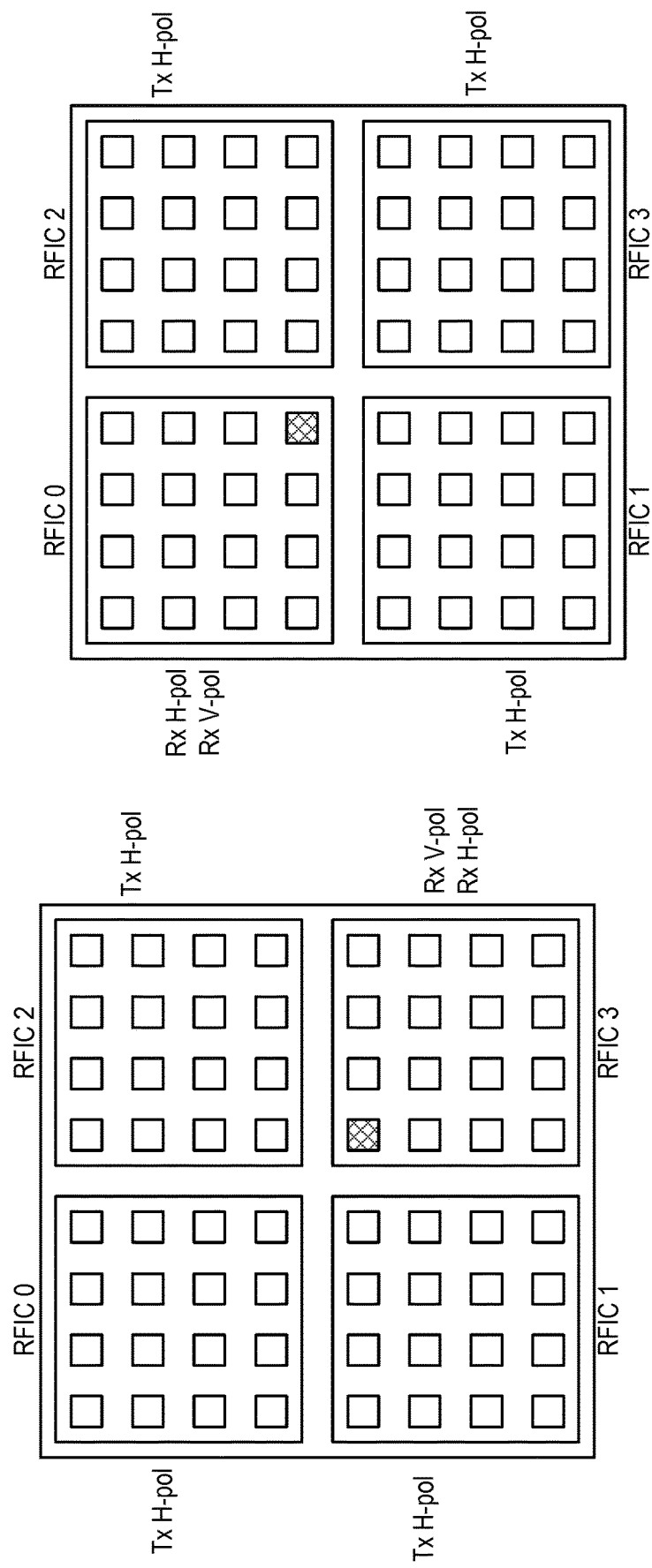
FIG. 6 illustrates another example of the AAS of FIG. 1 and the setting and changing of the receive antenna element used for measurement in the measurement process described in FIG. 4 according to some embodiments of the present disclosure.

FIG. 5 is for a situation where TDD is hard coded so individual ASICs need to be enabled or disabled to switch Tx or Rx blocks in both polarizations. In FIG. 6, Tx can be run in all ASICs in one polarization while having a Rx enabled in the other polarization.

Figure 7:
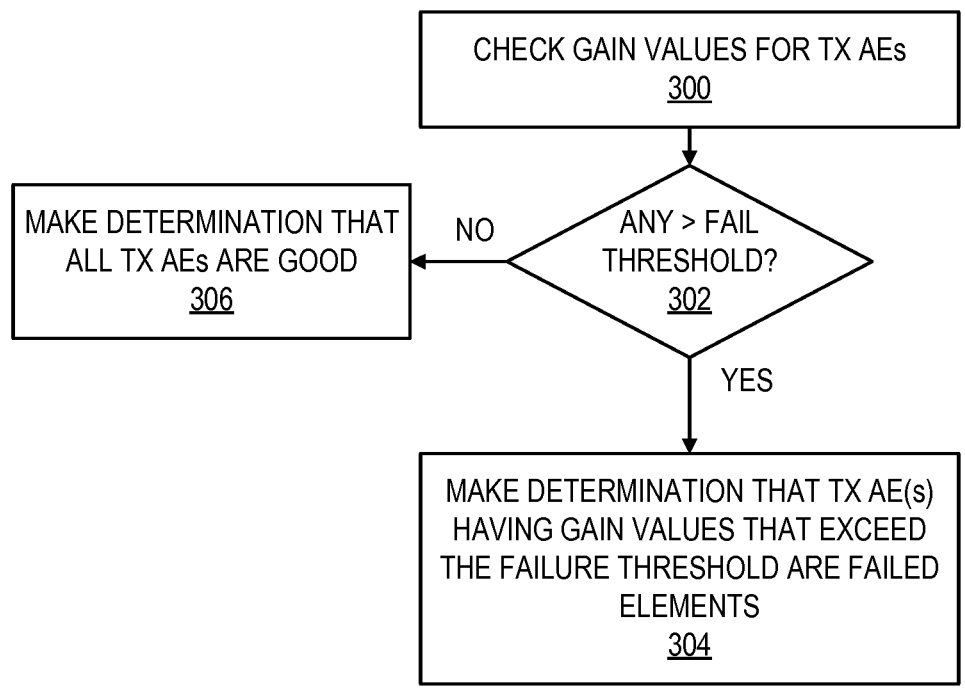
FIG. 7 is a flow chart that illustrates a process for detecting failed transmit antenna elements according to some embodiments of the present disclosure.

FIG. 7 is a flow chart that illustrates a process for detecting failed transmit antenna elements according to some embodiments of the present disclosure. As illustrated, the self-calibration subsystem 22 checks the computed gain calibration values for the Tx antenna elements of both the first and second polarizations (step 300) and determines whether any of the computed gain calibration values exceeds a predefined threshold that is indicative of a failed antenna element (step 302). This predefined threshold may be a large value that is outside of normal expected values, e.g., near infinity. If any of the computed gain calibration values exceed the failure threshold, then the self-calibration subsystem 22 makes a determination that the respective transmit antenna elements are failed antenna elements (step 304). If none of the computed gain calibration values exceed the failure threshold, then the self-calibration subsystem 22 makes a determination that all of the antenna elements are good antenna elements (step 306). Note that the process of FIG. 7 may be performed, e.g., after step 102 of FIG. 3 but prior to or as part of step 104.

Figure 8:
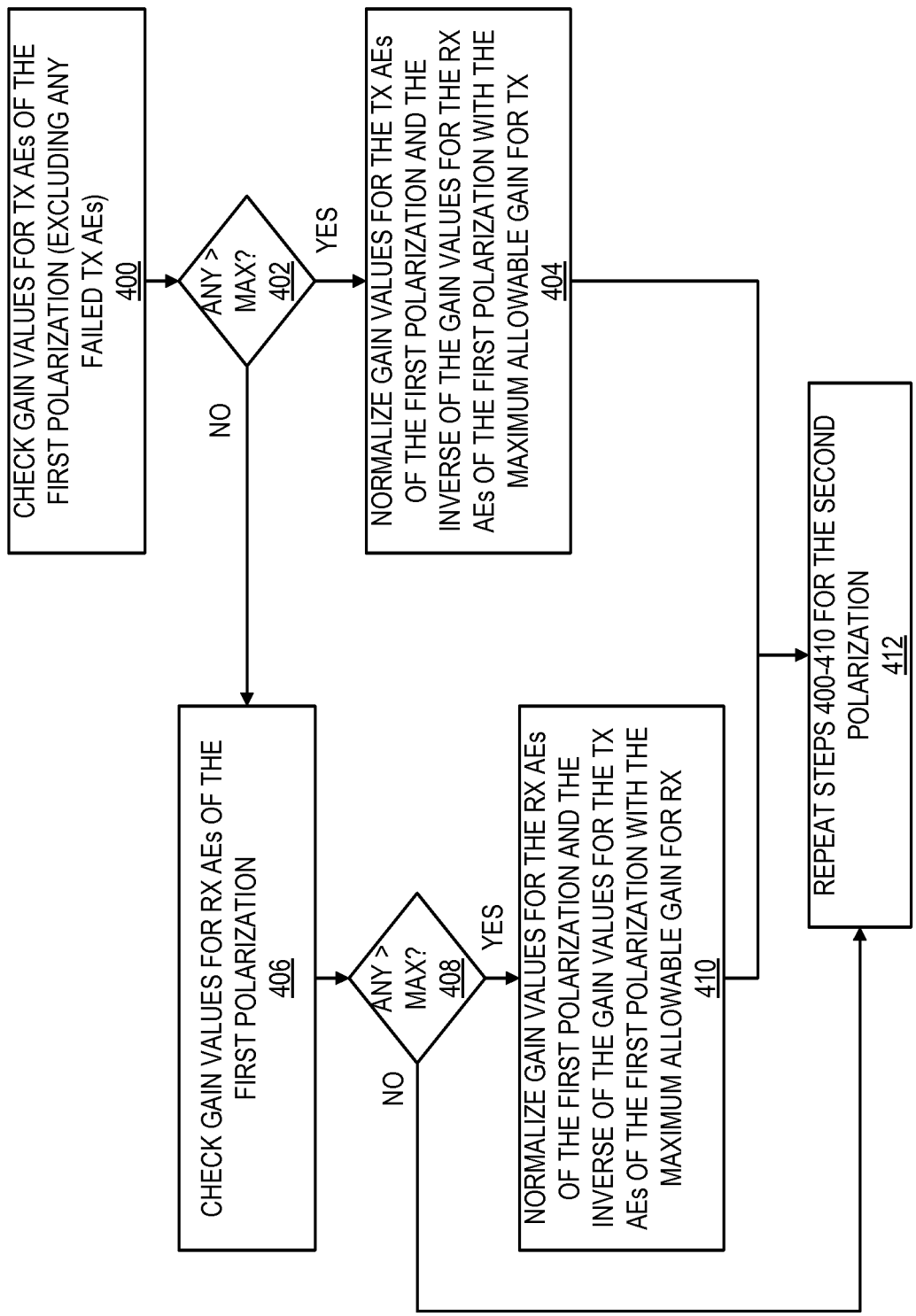
FIG. 8 is a flow chart that illustrates step 104 of FIG. 3 in more detail according to some embodiments of the present disclosure.

At least in some implementations, when normalizing the calibration values with respect to one of the antenna elements as a reference, there are scenarios in which the computed Tx or Rx gain calibration value for a particular antenna element exceeds the maximum Tx or Rx gain allowable (i.e., possible) in the hardware used to implement the gain and phase adjustment circuitry 18. In this regard, FIG. 8 illustrates a process by which the self-calibration subsystem 22 adjusts the computed gain values to stay with these hardware limitations in accordance with some embodiments of the present disclosure. This process is a more detailed example of step 104 of FIG. 3.

As illustrated, the self-calibration subsystem 22, and in particular the post-processing function 28, checks the computed gain calibration values for the Tx antenna elements of the first polarization (e.g., the vertical polarization), excluding any failed antenna elements identified by, e.g., the process of FIG. 7 (step 400). If any of these gain calibration values exceeds the maximum Tx gain allowed by the gain and phase adjustment circuitry 18 (step 402, YES), the self-calibration subsystem 22 normalizes the gain values for the Tx antenna elements of the first polarization and the inverse of the gain calibration values computed for the Rx antenna elements of the first polarization with the maximum Tx gain (step 404).

If none of the gain calibration values computed for the Tx antenna elements of the first polarization exceed the maximum Tx gain (step 402, NO), the self-calibration subsystem 22 checks the gain calibration values computed for the Rx antenna elements of the first polarization (step 406). If any of the gain calibration values computed for the Rx antenna elements of the first polarization exceeds a maximum Rx gain allowed by the gain and phase adjustment circuitry 18 (step 408, YES), the self-calibration subsystem 22 normalizes the gain values for the Rx antenna elements of the first polarization and the inverse of the gain calibration values computed for the Tx antenna elements of the first polarization with the maximum Rx gain (step 410).

Lastly, step 404, the NO branch of step 408, or step 410, the self-calibration subsystem 22 repeats steps 400 through 410 for the second polarization (e.g., the horizontal polarization).

Figure 9:
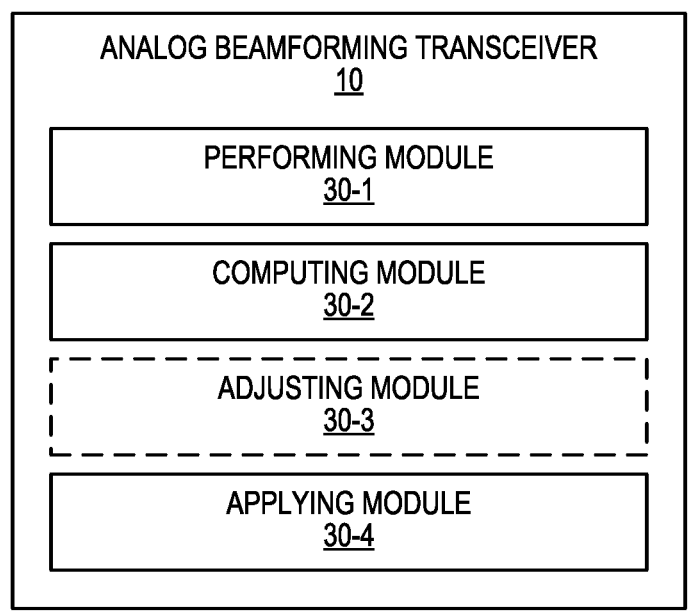
FIG. 9 illustrates the analog beamforming transceiver according to some other embodiments of the present disclosure.

FIG. 9 illustrates the analog beamforming transceiver 10 according to some other embodiments of the present disclosure. In this embodiment, the analog beamforming transceiver 10 includes a number of modules 30 that operate to provide self-calibration according to any one of the embodiments described herein. In this particular example, the modules 30 include a performing module 30-1 that operates to perform measurements as described herein, a computing module 30-2 that operates to compute the calibration values for the antenna elements based on the measurements obtained by the performing module 30-1 as described herein, an optional adjusting module 30-3 operates to adjust the calibration values computed by the computing module 30-2 to stay within hardware limitations as described above, and an applying module 30-4 that operates to apply the (adjusted) calibration values as described above. Each of the modules 30 is implemented in software.

Figure 10:
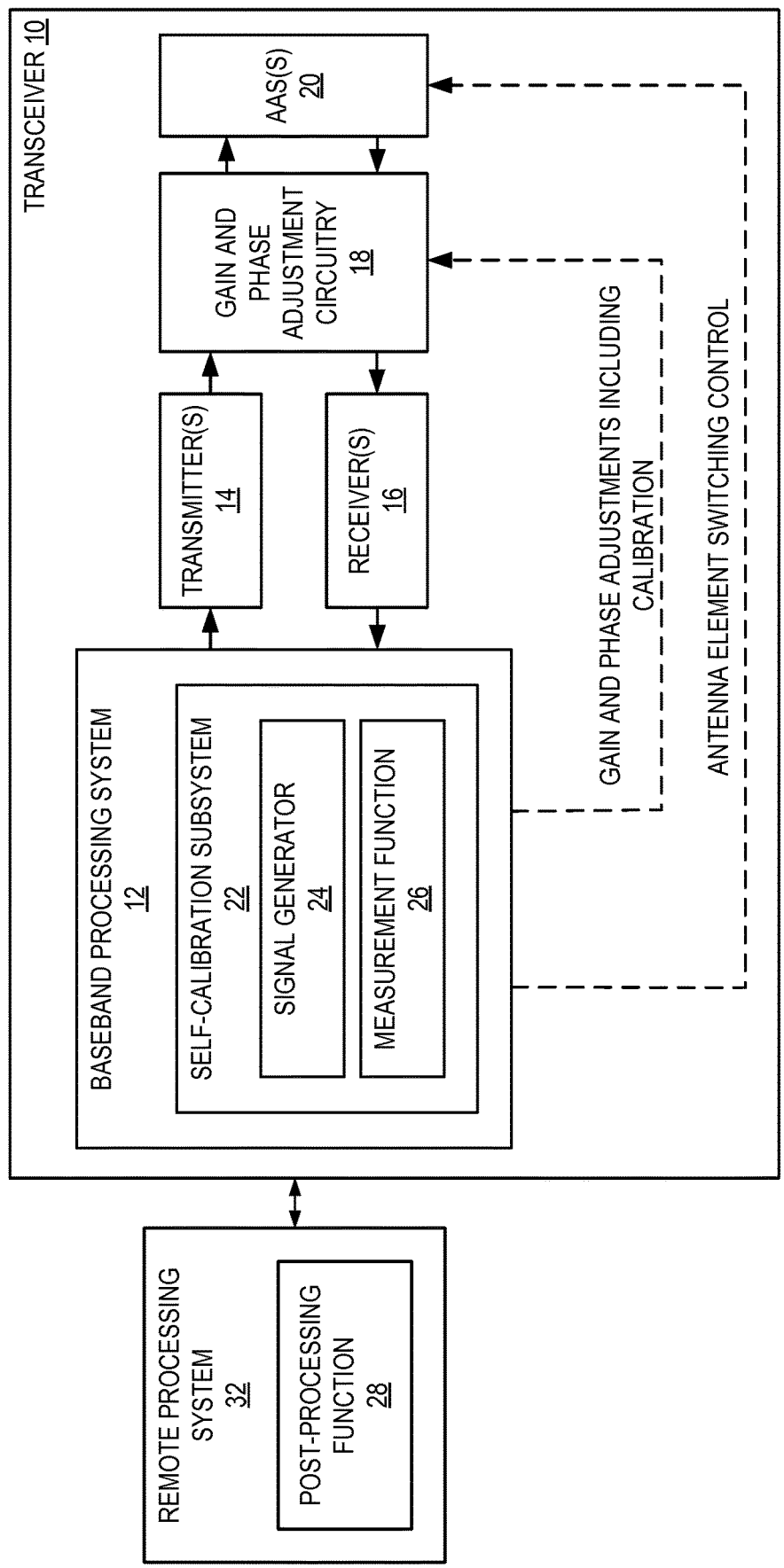
FIGS. 10 and 11 illustrate examples in which at least a portion of the self-calibration subsystem of FIG. 1 is implemented remotely from the analog beamforming transceiver according to some other embodiments of the present disclosure.

In the embodiments above, the self-calibration subsystem 22 is implemented locally at the analog beamforming transceiver 10. However, in some alternative embodiments, the self-calibration subsystem 22 may at least partially be implemented by a remote processing system. In this regard, FIG. 10 illustrates a system including the transceiver 10 and a remote processing system 32 according to some other embodiments of the present disclosure. The transceiver 10 is the same as that described above other than the post-processing function 28. In this embodiment, the post-processing function 28 is implemented at the remote processing system 32. The remote processing system 32 is implemented in a combination of hardware and software. For example, the remote processing system 32 may include one or more processors (e.g., CPUs, DSPs, ASICs, FPGAs, and/or the like) and memory storing software executed by the processor(s) whereby the remote processing system 32 operates to provide the functionality of the post-processing function 28 as described herein. The remote processing system 32 includes a communication interface (e.g., a wired or wireless network interface) that communicatively couples to the transceiver 10. As one example, the transceiver 10 may be part of a radio access node (e.g., a base station) in a cellular communications system, and the remote processing system 32 may be, e.g., another network node such as, e.g., a core network node in a core network of the cellular communications system.

Figure 11:
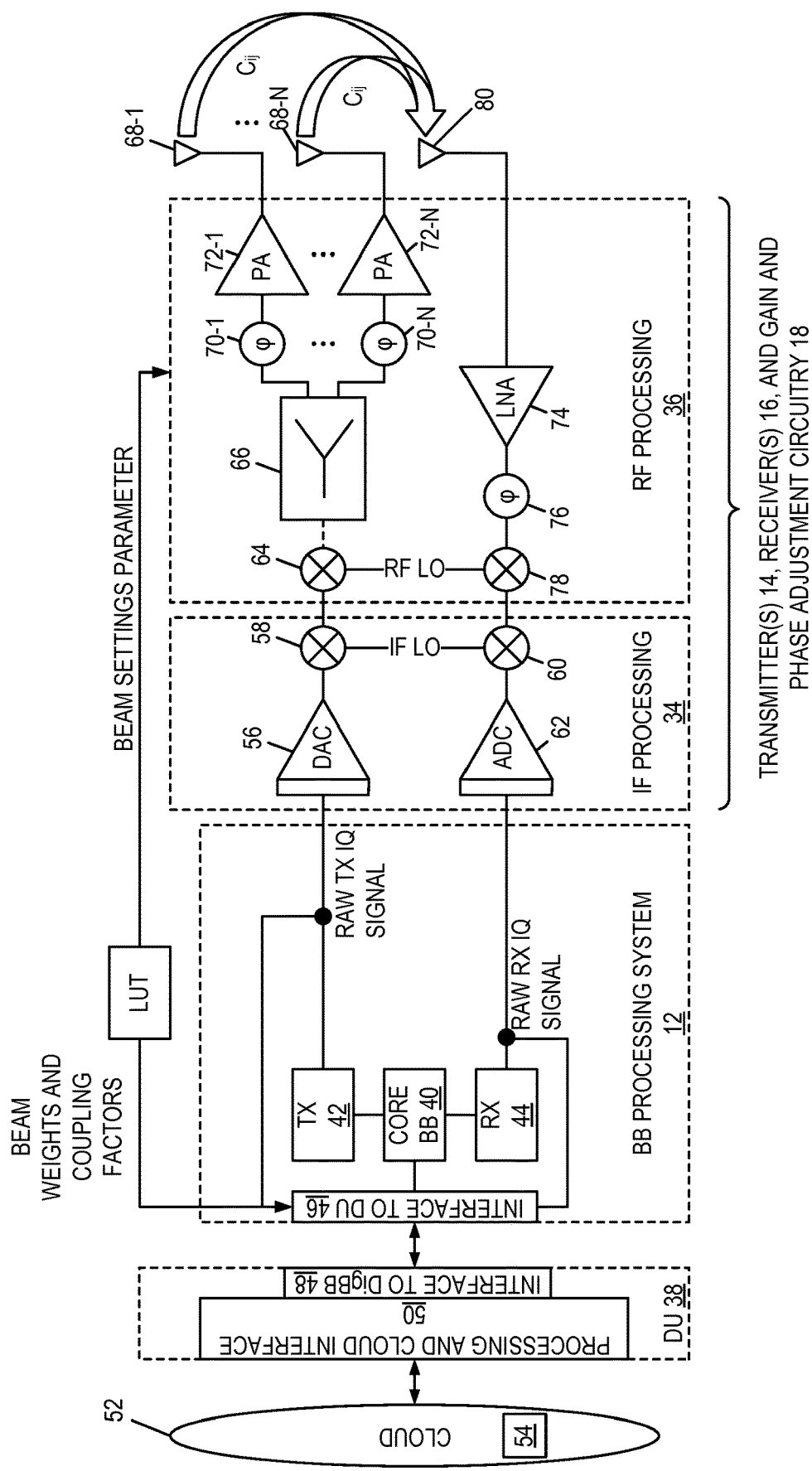

FIG. 11 illustrates another example embodiment of the transceiver 10. In this example embodiment, some of the functionality of the self-calibration subsystem 22 is implemented "in the cloud." As such, this modified version of the self-calibration subsystem 22 is referred to as self-calibration subsystem 22'. In particular, in some embodiments, the functionality of the post-processing function 28 is implemented in the cloud, as an example.

As illustrated in FIG. 11, the transceiver 10 includes the baseband processing system 12 which may be implemented as, e.g., an ASIC. The transceiver 10 also includes the transmitter(s) 14, the receiver(s) 16, and the gain and phase adjustment circuitry 18, which are, in this example, implemented as an Intermediate Frequency (IF) processing subsystem 34 and a Radio Frequency (RF) processing subsystem 36 which may be implemented on, e.g., one or more ASICs. In addition, the transceiver 10 includes a digital unit 38 that communicatively couples the baseband processing system 12 to the cloud. More specifically, the baseband processing system 12 additionally includes a core baseband processor 40, a baseband transmit processor 42, a baseband receive processor 44, and an interface 46 to the digital unit 38. The digital unit 38 includes an interface 48 to the baseband processing system 12 and a processing and cloud interface block 50 that performs processing for the digital unit 38 and provides an interface to a cloud network 52. The cloud network 52 includes one or more processing nodes 54 on which some of the functionality of the self-calibration subsystem 22 is implemented. The one or more processing nodes 54 each include, e.g., one or more processors (e.g., one or more CPUs or the like), memory including software executable by the processor(s) to provide the desired functionality, and a network interface(s).

The IF processing subsystem 34 includes a Digital-to-Analog Converter (DAC) 56 and a mixer 58 for digital to analog conversion and upconversion of the baseband transmit signal from baseband to IF prior to RF processing. In a similar manner, the IF processing subsystem 34 includes a mixer 60 and an Analog-to-Digital Converter (ADC) 62 for downconversion and analog to digital conversion of the receive signal from RF to digital baseband.

The RF processing subsystem 36 includes a mixer 64 for upconversion of the transmit signal from IF to RF and a splitter 66 that simultaneously provides the RF transmit signal to a number of transmit branches, each coupled to a respective Tx antenna element in the AAS 20 (represented by Tx antenna elements 68-1 through 68-N). Here, there are N transmit paths including phase adjustment circuits 70-1 through 70-N and Power Amplifiers (PAs) 72-1 through 72-N (provide gain adjustment), respectively.

The RF processing subsystem 36 also includes a Low Noise Amplifier (LNA) 74 (can be used to provide Rx gain adjustment), a phase adjustment circuit 76, and a mixer 78 that form an RF receive path. The RF receive path is coupled to an activated Rx antenna element 80 as described above.

During transmission of a known signal via the Tx antenna elements 68-1 through 68-N of one polarization, a resulting signal is received via the Rx antenna element 80 of the other polarization due to cross-polarization coupling between the Tx antenna elements 68-1 through 68-N and the Rx antenna element 80. This received signal is processed by the RF receive path to output an IF receive signal to the IF processing subsystem 34. The IF processing subsystem 34 coverts the IF receive signal to a digital baseband receive signal, which is then measured by the self-calibration subsystem 22', e.g., in the baseband processing system 12. In this example, the baseband processing system 12 obtains the measurement values and provides the measurement values as well as the known beamforming weights and antenna coupling factors to the processing node(s) 54 in the cloud network 52, where the measurement values are processed to compute the calibration values for the Tx and Rx antenna elements, as described above. Alternatively, rather than measuring the receive signal, the received signal is provided to the processing node(s) 54 in the cloud network 52, where the processing node(s) 54 obtains the measurement value(s) from the received signal. The processing node(s) 54 in the cloud network 52 provide the calibration values to the baseband processing system 12, which then applies the calibration values, as described above. Note that the functionality of the self-calibration subsystem 22' may be fully implemented at the processing node(s) 54 in the cloud network 52 or distributed between the processing node(s) 54 in the cloud network 52 and the baseband processing system 12 at the transceiver 10 in any desired manner.

The following acronyms are used throughout this disclosure.

3G Third Generation
3GPP Third Generation Partnership Project
5G Fifth Generation
AAS Advanced Antenna System
ADC Analog-to-Digital Converter
ASIC Application Specific Integrated Circuit
CPU Central Processing Unit
DAC Digital-to-Analog Converter
DSP Digital Signal Processor
FPGA Field Programmable Gate Array
IF Intermediate Frequency
LNA Low Noise Amplifier
LTE Long Term Evolution
NR New Radio
OTA Over-the-Air
PA Power Amplifier
RF Radio Frequency
RFIC Radio Frequency Integrated Circuit
Rx Receive
Tx Transmit
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a self-calibration subsystem of an analog beamforming transceiver to perform self-calibration of antenna elements comprised in the analog beamforming transceiver, comprising:

for each receive antenna element of a plurality of receive antenna elements of a first polarization, the plurality of receive antenna elements of the first polarization being all or a subset of all receive antenna elements of the first polarization:
for each transmit beam direction of a plurality of transmit beam directions for a second polarization, the plurality of transmit beam directions for the second polarization being all or a subset of all transmit beam directions for the analog beamforming transceiver for the second polarization:
transmitting a signal in the transmit beam direction via a plurality of transmit antenna elements of the second polarization, the plurality of transmit antenna elements of the second polarization being all or a subset of all transmit antenna elements of the second polarization; and
obtaining a measurement value for a received signal received via the receive antenna element of the first polarization responsive to the signal transmitted in the transmit beam direction via the plurality of transmit antenna elements of the second polarization;
computing calibration values for the plurality of receive antenna elements of the first polarization and calibration values for the plurality of transmit antenna elements of the second polarization based on the measurement values obtained for each of the plurality of receive antenna elements of the first polarization for each of the plurality of transmit beam directions for the second polarization and known coupling factors between the plurality of receive antenna elements of the first polarization and the plurality of transmit antenna elements of the second polarization; and
applying the calibration values for the plurality of receive antenna elements of the first polarization and the calibration values for the plurality of transmit antenna elements of the second polarization.

2. The method of claim 1 further comprising:
for each receive antenna element of a plurality of receive antenna elements of the second polarization, the plurality of receive antenna elements of the second polarization being all or a subset of all receive antenna elements of the second polarization:
for each transmit beam direction of a plurality of transmit beam directions for the first polarization, the plurality of transmit beam directions for the first polarization being all or a subset of all transmit beam directions for the analog beamforming transceiver for the first polarization:
transmitting a signal in the transmit beam direction via a plurality of transmit antenna elements of the first polarization, the plurality of transmit antenna elements of the first polarization being all or a subset of all transmit antenna elements of the first polarization; and
obtaining a measurement value for a received signal received via the receive antenna element of the second polarization responsive to the signal transmitted in the transmit beam direction via the plurality of transmit antenna elements of the first polarization;
computing calibration values for the plurality of receive antenna elements of the second polarization and calibration values for the plurality of transmit antenna elements of the first polarization based on the measurement values obtained for each of the plurality of receive antenna elements of the second polarization for each of the plurality of transmit beam directions for the first polarization and known coupling factors between the plurality of receive antenna elements of the second polarization and the plurality of transmit antenna elements of the first polarization; and
applying the calibration values for the plurality of receive antenna elements of the second polarization and the calibration values for the plurality of transmit antenna elements of the first polarization.

3. The method of claim 2 wherein:
the calibration values for the plurality of receive antenna elements of the first polarization are gain and phase correction values for the plurality of receive antenna elements of the first polarization that are normalized to gain and phase values for a reference receive antenna element of the first polarization;
the calibration values for the plurality of transmit antenna elements of the second polarization are gain and phase correction values for the plurality of transmit antenna elements of the second polarization that are normalized to gain and phase values for a reference transmit antenna element of the second polarization;
the calibration values for the plurality of receive antenna elements of the second polarization are gain and phase correction values for the plurality of receive antenna elements of the second polarization that are normalized to gain and phase values for a reference receive antenna element of the second polarization; and
the calibration values for the plurality of transmit antenna elements of the first polarization are gain and phase correction values for the plurality of transmit antenna elements of the first polarization that are normalized to gain and phase values for a reference transmit antenna element of the first polarization.

4. The method of claim 3 further comprising, prior to applying the calibration values for the plurality of receive antenna elements of the first polarization and the calibration values for the plurality of transmit antenna elements of the second polarization and applying the calibration values for the plurality of receive antenna elements of the second polarization and the calibration values for the plurality of transmit antenna elements of the first polarization:
determining whether any gain values for the plurality of transmit antenna elements of the first polarization exceed a maximum transmit gain of the analog beamforming transceiver; and
if any of the gain values for the plurality of transmit antenna elements of the first polarization exceed the maximum transmit gain, normalizing the gain values for the plurality of transmit antenna elements of the first polarization and an inverse of gain values for the plurality of receive antenna elements of the first polarization with the maximum transmit gain.

5. The method of claim 3 further comprising, prior to applying the calibration values for the plurality of receive antenna elements of the first polarization and the calibration values for the plurality of transmit antenna elements of the second polarization and applying the calibration values for the plurality of receive antenna elements of the second polarization and the calibration values for the plurality of transmit antenna elements of the first polarization:
determining whether any of the gain values for the plurality of receive antenna elements of the first polarization exceed a maximum receive gain of the analog beamforming transceiver; and
if any of the gain values for the plurality of receive antenna elements of the first polarization exceed the maximum receive gain, normalizing 410 the gain values for the plurality of receive antenna elements of the first polarization and an inverse of the gain values for the plurality of transmit antenna elements of the first polarization with the maximum receive gain.

6. The method of any one of claim 3 further comprising, prior to applying the calibration values for the plurality of receive antenna elements of the first polarization and the calibration values for the plurality of transmit antenna elements of the second polarization and applying the calibration values for the plurality of receive antenna elements of the second polarization and the calibration values for the plurality of transmit antenna elements of the first polarization:
  determining whether any gain values for the plurality of transmit antenna elements of the second polarization exceed a maximum transmit gain of the analog beamforming transceiver; and
  if any of the gain values for the plurality of transmit antenna elements of the second polarization exceed the maximum transmit gain, normalizing the gain values for the plurality of transmit antenna elements of the second polarization and an inverse of gain values for the plurality of receive antenna elements of the second polarization with the maximum transmit gain.

7. The method of any one of claim 3 further comprising, prior to applying the calibration values for the plurality of receive antenna elements of the first polarization and the calibration values for the plurality of transmit antenna elements of the second polarization and applying the calibration values for the plurality of receive antenna elements of the second polarization and the calibration values for the plurality of transmit antenna elements of the first polarization:
  determining whether any of the gain values for the plurality of receive antenna elements of the second polarization exceed a maximum receive gain of the analog beamforming transceiver; and
  if any of the gain values for the plurality of receive antenna elements of the second polarization exceed the maximum receive gain, normalizing the gain values for the plurality of receive antenna elements of the second polarization and an inverse of the gain values for the plurality of transmit antenna elements of the second polarization with the maximum receive gain.

8. The method of claim 1 wherein the plurality of receive antenna elements of the first polarization are implemented on separate hardware than that of the plurality of transmit antenna elements of the second polarization.

9. The method of any one of claim 1 wherein the plurality of receive antenna elements of the second polarization are implemented on separate hardware than that of the plurality of transmit antenna elements of the first polarization.

10. The method of claim 1 wherein the signals transmitted via the plurality of transmit antenna elements of the second polarization are live signals.

11. The method of claim 1 wherein the self-calibration subsystem is integrated with the analog beamforming transceiver.

12. The method of claim 1 wherein at least part of the self-calibration subsystem is implemented as one or more virtual components that are executing on one or more processing nodes in a network.

13. An analog beamforming transceiver, comprising:
  an antenna system comprising receive antenna elements of a first polarization and transmit antenna elements of a second polarization;
  gain and phase adjustment circuitry adapted to provide gain and phase adjustments, in an analog domain, for the receive antenna elements of the first polarization and the transmit antenna elements of the second polarization; and
  a self-calibration subsystem is operable to:
  for each receive antenna element of a plurality of receive antenna elements of the first polarization, the plurality of receive antenna elements of the first polarization being all or a subset of all of the receive antenna elements of the first polarization:
    for each transmit beam direction of a plurality of transmit beam directions for the second polarization, the plurality of transmit beam directions for the second polarization being all or a subset of all transmit beam directions for the analog beamforming transceiver for the second polarization:
      transmit a signal in the transmit beam direction via a plurality of transmit antenna elements of the second polarization, the plurality of transmit antenna elements of the second polarization being all or a subset of all of the transmit antenna elements of the second polarization; and
      obtain a measurement value for a received signal received via the receive antenna elements of the first polarization responsive to the signal transmitted in the transmit beam direction via the plurality of transmit antenna elements of the second polarization;
    compute calibration values for the plurality of receive antenna elements of the first polarization and calibration values for the plurality of transmit antenna elements of the second polarization based on the measurement values obtained for each of the plurality of receive antenna elements of the first polarization for each of the plurality of transmit beam directions for the second polarization and known coupling factors between the plurality of receive antenna elements of the first polarization and the plurality of transmit antenna elements of the second polarization; and
  apply, via the gain and phase adjustment circuitry, the calibration values for the plurality of receive antenna elements of the first polarization and the calibration values for the plurality of transmit antenna elements of the second polarization.

14. The analog beamforming transceiver of claim 13 wherein:
  the antenna system further comprises receive antenna elements of the second polarization and transmit antenna elements of the first polarization; and
  the self-calibration subsystem is further operable to:
  for each receive antenna element of a plurality of receive antenna elements of the second polarization, the plurality of receive antenna elements of the second polarization being all or a subset of all of the receive antenna elements of the second polarization:
    for each transmit beam direction of a plurality of transmit beam directions for the first polarization, the plurality of transmit beam directions for the first polarization being all or a subset of all transmit beam directions for the analog beamforming transceiver for the first polarization:
      transmit a signal in the transmit beam direction via a plurality of transmit antenna elements of the first polarization, the plurality of transmit antenna elements of the first polarization being all or a subset of all of the transmit antenna elements of the first polarization; and
      obtain a measurement value for a received signal received via the receive antenna element of the second polarization responsive to the signal transmitted in the transmit beam direction via the plurality of transmit antenna elements of the first polarization;

compute calibration values for the plurality of receive antenna elements of the second polarization and calibration values for the plurality of transmit antenna elements of the first polarization based on the measurement values obtained for each of the plurality of receive antenna elements of the second polarization for each of the plurality of transmit beam directions for the first polarization and known coupling factors between the plurality of receive antenna elements of the second polarization and the plurality of transmit antenna elements of the first polarization; and apply, via the gain and phase adjustment circuitry, the calibration values for the plurality of receive antenna elements of the second polarization and the calibration values for the plurality of transmit antenna elements of the first polarization.

15. The analog beamforming transceiver of claim 14 wherein:

the calibration values for the plurality of receive antenna elements of the first polarization are gain and phase correction values for the plurality of receive antenna elements of the first polarization that are normalized to gain and phase values for a reference receive antenna element of the first polarization;

the calibration values for the plurality of transmit antenna elements of the second polarization are gain and phase correction values for the plurality of transmit antenna elements of the second polarization that are normalized to gain and phase values for a reference transmit antenna element of the second polarization;

the calibration values for the plurality of receive antenna elements of the second polarization are gain and phase correction values for the plurality of receive antenna elements of the second polarization that are normalized to gain and phase values for a reference receive antenna element of the second polarization; and the calibration values for the plurality of transmit antenna elements of the first polarization are gain and phase correction values for the plurality of transmit antenna elements of the first polarization that are normalized to gain and phase values for a reference transmit antenna element of the first polarization.

16. The analog beamforming transceiver of claim 15 wherein the self-calibration subsystem is further operable to, prior to applying the calibration values for the plurality of receive antenna elements of the first polarization and the calibration values for the plurality of transmit antenna elements of the second polarization and applying the calibration values for the plurality of receive antenna elements of the second polarization and the calibration values for the plurality of transmit antenna elements of the first polarization:

determine whether any gain values for the plurality of transmit antenna elements of the first polarization exceed a maximum transmit gain of the analog beamforming transceiver; and if any of the gain values for the plurality of transmit antenna elements of the first polarization exceed the maximum transmit gain, normalize the gain values for the plurality of transmit antenna elements of the first polarization and an inverse of gain values for the plurality of receive antenna elements of the first polarization with the maximum transmit gain.

17. The analog beamforming transceiver of claim 15 wherein the self-calibration subsystem is further operable to, prior to applying the calibration values for the plurality of receive antenna elements of the first polarization and the calibration values for the plurality of transmit antenna elements of the second polarization and applying the calibration values for the plurality of receive antenna elements of the second polarization and the calibration values for the plurality of transmit antenna elements of the first polarization:

determine whether any of the gain values for the plurality of receive antenna elements of the first polarization exceed a maximum receive gain of the analog beamforming transceiver; and if any of the gain values for the plurality of receive antenna elements of the first polarization exceed the maximum receive gain, normalize the gain values for the plurality of receive antenna elements of the first polarization and an inverse of the gain values for the plurality of transmit antenna elements of the first polarization with the maximum receive gain.

18. The analog beamforming transceiver of claim 15 wherein the self-calibration subsystem is further operable to, prior to applying the calibration values for the plurality of receive antenna elements of the first polarization and the calibration values for the plurality of transmit antenna elements of the second polarization and applying the calibration values for the plurality of receive antenna elements of the second polarization and the calibration values for the plurality of transmit antenna elements of the first polarization:

determine whether any gain values for the plurality of transmit antenna elements of the second polarization exceed a maximum transmit gain of the analog beamforming transceiver; and if any of the gain values for the plurality of transmit antenna elements of the second polarization exceed the maximum transmit gain, normalize the gain values for the plurality of transmit antenna elements of the second polarization and an inverse of gain values for the plurality of receive antenna elements of the second polarization with the maximum transmit gain.

19. The analog beamforming transceiver of claim 15 wherein the self-calibration subsystem is further operable to, prior to applying the calibration values for the plurality of receive antenna elements of the first polarization and the calibration values for the plurality of transmit antenna elements of the second polarization and applying the calibration values for the plurality of receive antenna elements of the second polarization and the calibration values for the plurality of transmit antenna elements of the first polarization:

determine whether any of the gain values for the plurality of receive antenna elements of the second polarization exceed a maximum receive gain of the analog beamforming transceiver; and if any of the gain values for the plurality of receive antenna elements of the second polarization exceed the maximum receive gain, normalize the gain values for the plurality of receive antenna elements of the second polarization and an inverse of the gain values for the plurality of transmit antenna elements of the second polarization with the maximum receive gain.

20. The analog beamforming transceiver of claim 13 wherein the plurality of receive antenna elements of the first polarization are implemented on separate hardware than that of the plurality of transmit antenna elements of the second polarization.

21. The analog beamforming transceiver claim 13 wherein the plurality of receive antenna elements of the second polarization are implemented on separate hardware than that of the plurality of transmit antenna elements of the first polarization.

22. The analog beamforming transceiver of claim 13 wherein the signals transmitted via the plurality of transmit antenna elements of the second polarization are live signals.

23. The analog beamforming transceiver of claim 13 wherein the self-calibration subsystem is comprised in the analog beamforming transceiver.

24. The analog beamforming transceiver of claim 13 wherein at least part of the self-calibration subsystem is implemented as one or more virtual components that are executing on one or more processing nodes in a network.

25. A method of determining failed transmit antenna elements in an analog beamforming transceiver, comprising:
   for each receive antenna element of a plurality of receive antenna elements of a first polarization, the plurality of receive antenna elements of the first polarization being all or a subset of all receive antenna elements of the first polarization:
      for each transmit beam direction of a plurality of transmit beam directions for a second polarization, the plurality of transmit beam directions for the second polarization being all or a subset of all transmit beam directions for the analog beamforming transceiver for the second polarization:
         transmitting a signal in the transmit beam direction via a plurality of transmit antenna elements of the second polarization, the plurality of transmit antenna elements of the second polarization being all or a subset of all transmit antenna elements of the second polarization; and
         obtaining a measurement value for a received signal received via the receive antenna element of the first polarization responsive to the signal transmitted in the transmit beam direction via the plurality of transmit antenna elements of the second polarization;
      computing calibration values for the plurality of receive antenna elements of the first polarization and calibration values for the plurality of transmit antenna elements of the second polarization based on the measurement values obtained for each of the plurality of receive antenna elements of the first polarization for each of the plurality of transmit beam directions for the second polarization and known coupling factors between the plurality of receive antenna elements of the first polarization and the plurality of transmit antenna elements of the second polarization; and
      determining whether any of the plurality of transmit antenna elements of the second polarization have failed based on the calibration values computed for the plurality of transmit antenna elements of the second polarization.

* * * * *